(12) United States Patent
Hallowell et al.

(10) Patent No.: US 10,851,305 B2
(45) Date of Patent: Dec. 1, 2020

(54) COMBINED HEAT, POWER, AND BIOCHAR WITH VENTILATOR

(71) Applicants: Jeffrey R. Hallowell, Woodstock, CT (US); Benjamin Hallowell, Athens, GA (US)

(72) Inventors: Jeffrey R. Hallowell, Woodstock, CT (US); Benjamin Hallowell, Athens, GA (US)

(73) Assignee: Biomass Controls PBC, Woodstock, CT (US)

( * ) Notice: Subject to any disclaimer, the term of this patent is extended or adjusted under 35 U.S.C. 154(b) by 435 days.

(21) Appl. No.: 14/656,577

(22) Filed: Mar. 12, 2015

(65) Prior Publication Data

US 2015/0259603 A1 Sep. 17, 2015

Related U.S. Application Data

(60) Provisional application No. 61/951,707, filed on Mar. 12, 2014, provisional application No. 61/977,440, filed on Apr. 9, 2014.

(51) Int. Cl.
  *C10B 7/10* (2006.01)
  *C10B 47/44* (2006.01)
  (Continued)

(52) U.S. Cl.
  CPC .............. *C10B 7/10* (2013.01); *C10B 33/02* (2013.01); *C10B 47/44* (2013.01); *C10B 49/02* (2013.01);
  (Continued)

(58) Field of Classification Search
  None
  See application file for complete search history.

(56) References Cited

U.S. PATENT DOCUMENTS

| 2,814,531 A | 11/1957 | Murray, Jr. ............... 302/22 |
| 4,020,822 A | 5/1977 | Harris ............... 126/110 R |

(Continued)

FOREIGN PATENT DOCUMENTS

| EP | 0529368 A2 | 3/1993 | ............. F23D 14/18 |
| EP | 2039995 A1 | 3/2009 | ............. F23C 99/00 |

(Continued)

OTHER PUBLICATIONS

Austin, "A New Climate Change Mitigation Tool," Biomass Magazine, http://www.biomassmagazine.com/articles/3091/a-new-climate-change-mitigation-tool/, Oct. 2009, 3 pages.
(Continued)

Primary Examiner — Neil N Turk
(74) Attorney, Agent, or Firm — Sunstein LLP

(57) ABSTRACT

The production of biochar generates syngas, VOCs, CO and other gasses that can adsorb to biochar and reduce the quality of the final product. A controller measures the operating parameters, such as temperature, pressure and oxygen level, and automatically controls a feedstock auger motor, blower(s) and other subsystems of a continuous combined heat, power and biochar carbonizer. The carbonizer pyrolyzes feedstock. A catalytic converter combusts unburned components in by-product gases and generates additional thermal energy. Thermal energy drives an engine, such as a Sterling, steam, or ORC engine, to generate electricity or operate a mechanical device. Remaining thermal energy is transferred using another medium, such as air or water, via a heat exchanger. The feedstock is purposefully incompletely combusted, to produce biochar that consists largely of carbon. The biochar may be used to augment soil for cultivation, filtration or for other purposes. Some embodiments condense water from the exhaust to provide potable water.

21 Claims, 8 Drawing Sheets

(51) Int. Cl.
*C10B 53/02* (2006.01)
*C10L 5/44* (2006.01)
*C10B 33/02* (2006.01)
*C10B 49/02* (2006.01)

(52) U.S. Cl.
CPC .............. *C10B 53/02* (2013.01); *C10L 5/442* (2013.01); *C10L 5/445* (2013.01); *C10L 5/447* (2013.01); *Y02E 50/14* (2013.01)

(56) References Cited

U.S. PATENT DOCUMENTS

| | | | |
|---|---|---|---|
| 4,177,740 A | 12/1979 | Lamb et al. | 110/213 |
| 4,213,404 A | 7/1980 | Spaulding | 110/229 |
| 4,311,102 A | 1/1982 | Kolze et al. | 110/103 |
| 4,351,315 A | 9/1982 | Babbage | 126/73 |
| 4,363,785 A | 12/1982 | Willson | 422/173 |
| 4,432,307 A | 2/1984 | Godin | 122/14 |
| 4,483,256 A | 11/1984 | Brashear | 110/210 |
| 4,495,873 A | 1/1985 | Blankenship | 110/250 |
| 4,517,903 A | 5/1985 | Richmond et al. | 110/233 |
| 4,559,882 A | 12/1985 | Dobson | 110/254 |
| 4,565,184 A | 1/1986 | Collins et al. | 126/368 |
| 4,582,044 A | 4/1986 | Ferguson et al. | 126/289 |
| 4,699,069 A | 10/1987 | Park | 110/234 |
| 4,702,179 A | 10/1987 | Childs | 110/215 |
| 5,123,360 A | 6/1992 | Burke et al. | 110/233 |
| 5,139,008 A | 8/1992 | Timpano | 126/77 |
| 5,295,474 A | 3/1994 | Whitfield et al. | 126/152 R |
| 5,357,877 A | 10/1994 | Nuesmeyer et al. | 110/108 |
| 5,359,945 A | 11/1994 | Buckner et al. | 110/233 |
| 5,497,617 A | 3/1996 | Bagley et al. | 60/274 |
| 5,499,622 A | 3/1996 | Woods | 126/500 |
| 5,822,978 A | 10/1998 | Streit et al. | 60/274 |
| 5,839,375 A | 11/1998 | Kimberlin | 110/235 |
| 5,873,356 A | 2/1999 | Vossler et al. | 126/110 E |
| 5,893,358 A | 4/1999 | Whitfield | 126/73 |
| 5,941,234 A | 8/1999 | Norburn et al. | 126/146 |
| 6,055,915 A | 5/2000 | Bickell et al. | 110/186 |
| 6,189,463 B1 | 2/2001 | Ling et al. | 110/346 |
| 6,237,587 B1 | 5/2001 | Sparling et al. | 126/500 |
| 6,244,196 B1 | 6/2001 | Kimberlin | 110/317 |
| 7,318,431 B1 | 1/2008 | Holtan et al. | 126/7 |
| 7,334,345 B2 | 2/2008 | Lasonde | 34/181 |
| 7,878,300 B2 | 2/2011 | Sammut et al. | 181/249 |
| 8,293,958 B2 | 10/2012 | Cheiky | 585/240 |
| 8,361,186 B1* | 1/2013 | Shearer | C05F 5/00 71/32 |
| 8,637,718 B2 | 1/2014 | Gupta et al. | 585/242 |
| 8,646,441 B2 | 2/2014 | Haas et al. | 126/77 |
| 8,691,115 B2 | 4/2014 | Schubert | 252/373 |
| 8,747,797 B2 | 6/2014 | Shearer et al. | 423/445 R |
| 8,772,559 B2 | 7/2014 | Smaidris | 585/240 |
| 8,812,162 B2 | 8/2014 | Schneider et al. | 700/274 |
| 8,951,476 B2 | 2/2015 | Cheiky et al. | 422/105 |
| 9,527,780 B2 | 12/2016 | Wilson et al. | |
| 9,752,078 B2* | 9/2017 | Aupperle | C10B 1/02 |
| 2001/0029004 A1 | 10/2001 | Sparling et al. | 431/326 |
| 2005/0112043 A1 | 5/2005 | Sparling et al. | 423/210 |
| 2006/0157047 A1 | 7/2006 | Tiegs | 126/77 |
| 2007/0114296 A1 | 5/2007 | Walborn | 237/2 R |
| 2007/0137538 A1 | 6/2007 | Sterr | 110/341 |
| 2008/0039975 A1 | 2/2008 | Haga et al. | 700/274 |
| 2008/0072806 A1 | 3/2008 | Kimberlin et al. | 110/346 |
| 2009/0050129 A1 | 2/2009 | Robinson, Jr. | 126/19 R |
| 2011/0008214 A1 | 1/2011 | Haas et al. | 422/105 |
| 2011/0214343 A1* | 9/2011 | Wechsler | C10B 53/02 44/605 |
| 2011/0247533 A1 | 10/2011 | Haas et al. | 110/216 |
| 2011/0300494 A1 | 12/2011 | Masen et al. | 431/12 |
| 2012/0043194 A1 | 2/2012 | Lepez et al. | 201/10 |
| 2012/0048158 A1 | 3/2012 | Grace et al. | 110/203 |
| 2012/0116589 A1 | 5/2012 | Schneider et al. | 700/274 |
| 2012/0201913 A1 | 8/2012 | Archer | 424/750 |
| 2012/0279221 A1 | 11/2012 | Durden | 60/645 |
| 2013/0081934 A1 | 4/2013 | New | 201/8 |
| 2013/0192971 A1 | 8/2013 | Cheiky | 201/7 |
| 2013/0264831 A1 | 10/2013 | Mason | |
| 2013/0299332 A1 | 11/2013 | Smaidris | |
| 2015/0081086 A1 | 3/2015 | Hallowell et al. | 700/209 |

FOREIGN PATENT DOCUMENTS

| | | | | |
|---|---|---|---|---|
| FR | 2939870 A1 | 6/2010 | | F23J 15/00 |
| WO | WO 2000/08390 A1 | 2/2000 | | F24B 5/02 |
| WO | WO 2009/144393 A1 | 12/2009 | | B01D 53/86 |
| WO | WO 2010/075580 A1 | 7/2010 | | F23D 14/00 |
| WO | WO 2012/061795 A2 | 5/2012 | | G05D 23/00 |
| WO | WO 2013/011520 | 1/2013 | | |
| WO | WO 2013/123096 | 8/2013 | | |
| WO | WO 2015/038994 A1 | 3/2015 | | F23N 1/04 |

OTHER PUBLICATIONS

Custom Fireplaces & More, "Catalytic or Non-Catalytic," http://www.customfireplacesandmore.com/40/catalytic-non-catalytic.html, Nov. 8, 2010, 5 pages.
Eckerlin, et al., "The Importance of Excess Air in the Combustion Process," Class notes, MAE 406, Ch. 3, North Carolina State University, Sep. 1, 2006, 16 pages.
Fordscorpio.co.uk, "Catalytic Converter," http://www.fordscorpio.co.uk/cats.htm, 2003, 3 pages.
International Searching Authority, Invitation to Pay Additional Fees and, Where Applicable, Protest Fee for International Application No. PCT/US2011/059480 dated Apr. 26, 2013, 8 pages.
International Searching Authority, International Search Report—International Application No. PCT/US2011/059480 dated Aug. 16, 2013, together with the Written Opinion of the International Searching Authority, 17 pages.
International Searching Authority, International Search Report—International Application No. PCT/US2014/055541 dated Dec. 9, 2014, together with the Written Opinion of the International Searching Authority, 11 pages.
International Searching Authority, International Search Report—International Application No. PCT/US2015/020284 dated Jun. 10, 2015, together with the Written Opinion of the International Searching Authority, 9 pages.
SHT Heiztechnik aus Salzburg, "Fully Automated Combi-Boiler for Wood-Pellets and Logwood 4, 5-25 kW," www.sht.at/fileadmin/user_upload/TDA_Prospekt-ENG_F10-1.pdf, 2006, 8 pages.
The Engineering ToolBox, "Stoichiometric Combustion, The Engineering ToolBox," http://www.engineeringtoolbox.com/stoichiometric-combustion-d_399.html, Aug. 7, 2013, 2 pages.
Wikipedia, Biochar, Wikipedia, Mar. 6, 2014, 6 pages.
Wimberly, "A Review of Biomass Furnaces for Heating Poultry Houses in the Northwest Arkansas Region," BioEnergy Systems LLC, Fayetteville, AR, Winrock International, May 2008, 59 pages.
European Patent Office, Extended European Search Report, Application No. 15760997.5, 8 pages, Jan. 31, 2018.

* cited by examiner

COMBINED HEAT, POWER, AND BIOCHAR WITH VENTILATOR

CROSS REFERENCE TO RELATED APPLICATIONS

This application claims the benefit of U.S. Provisional Patent Application No. 61/951,707, filed Mar. 12, 2014, titled "Control System for Continuous Combined Heat, Power and Biochar Burner" and U.S. Provisional Patent Application No. 61/977,440, filed Apr. 9, 2014, titled "Biochar Production Ventilator," the entire contents of each of which are hereby incorporated by reference herein, for all purposes.

TECHNICAL FIELD

The present invention relates to systems and methods for preventing degradation of biochar in a biochar production carbonizer and, more particularly, to systems and methods for ventilating the biochar to prevent volatile gases produced during production of the biochar from condensing and contaminating the pyrolyzed biomass.

BACKGROUND ART

Cogeneration, or combined heat and power (CHP), uses a heat engine or power station to simultaneously generate electricity and useful heat. Cogeneration is a thermodynamically efficient use of fuel. In the production of electricity at thermal power plants, some energy must be discarded as waste heat, but in cogeneration this thermal energy can be harnessed and used. All thermal power plants emit heat during electricity generation, which is released into the natural environment through cooling towers, flue gas or by other means. In contrast, CHP recaptures heat produced during electricity generation to heat the power plant or hot water for district heating, such as a small town. The latter is also called combined heat and power district heating (CHPDH).

Biomass is a renewable, biological material, derived from living or once living organisms and can include wood, crop, animal, plant, municipal, and industrial waste. Biofuel is a fuel source derived from biomass feedstock. Biomass is often converted to biofuels through chemical, physical, or biological conversion processes, or any combination of the three. Depending on the conversion process, biomass feedstock can generate biofuels in solid, liquid, or a gas form. Biofuels have increased in popularity because of rising oil prices and the need for energy security.

Rather than the composition or production method, it is the intended use that distinguishes biochar from charcoal, as biochar is produced for application to soil, while charcoal is produced for use in cooking and heating. Like charcoal, biochar is created by pyrolysis of biomass. Biochar has a variety of uses and has been used in place of activated carbon, in water and waste filtration, for carbon sequestration, as fuel, applied to soils to enhance nutrient retention, improve crop productivity, improve water holding capacity, reduce soil emissions, and improve the cation exchange capacity of soil. Able to sequester carbon and prevent it from re-entering the atmosphere, biochar has a negative carbon footprint and is currently under investigation as a viable carbon sequestration technique to help mitigate climate change. Biochar is predominantly composed of carbon, and can remain stable in the ground for about 90-1600 years depending on feedstock selection and pyrolysis conditions.

Biochar is also known as char, charcoal, biocarbon, agrichar, enhanced biochar, or biocore. Biochar is made from various feedstocks such as any material containing organic carbon, examples of which include biomass, compost, vinasse, miscanthus, corn stover, switchgrass, manure, sludge, poultry litter, and other materials lignin, cellulose, hemi-cellulose, and ash. After producing biochar, the biochar can be activated by adding organic chemicals and nutrients. Organisms can also be supplemented to the biochar to also improve functionality including bioremediation.

Biochar is produced through pyrolysis, which is the thermal decomposition of biomass in an environment with a negligible or limited supply of oxygen. Historically this has been done by smoldering agricultural waste in pits or trenches to limit the oxygen supply by covering burning biomass with soil. As such these methods were very inefficient, and produced high levels of emissions. While carbonizers are much more efficient at producing biochar and harnessing energy, current methods allow biochar to adsorb volatile gasses produced by the pyrolysis process. Not only does this lower the biochar's commercial value, since its adsorption properties have been reduced, but contaminated biochar may carry toxic chemicals into the soil it is introduced to.

SUMMARY OF EMBODIMENTS

An embodiment of the present invention provides a continuous biochar carbonizer. The continuous biochar carbonizer includes an enclosed combustion chamber. The combustion chamber has an exhaust stream. A catalytic converter is disposed within the exhaust stream. A heat-driven engine is thermally coupled to the exhaust stream, downstream of the catalytic converter. A motor-driven feedstock conveyor is coupled to the combustion chamber. A motor-driven blower is communicably coupled between a fresh air supply and the combustion chamber. The continuous biochar carbonizer also includes an enclosed biochar collection chamber. A motor-driven biochar conveyor is coupled between the combustion chamber and the biochar collection chamber. Speed of operation of the feedstock conveyor, speed of operation of the blower and speed of operation of the biochar conveyor may be independently controllable.

The continuous biochar carbonizer also includes at least one sensor. The at least one sensor is one or more of the following: a temperature sensor disposed within the biochar collection chamber, a volatile gas sensor disposed within the biochar collection chamber, a temperature sensor disposed within the combustion chamber, an oxygen sensor disposed within the combustion chamber, a temperature sensor disposed within the exhaust stream upstream of the catalytic converter, a temperature sensor disposed within the exhaust stream downstream of the catalytic converter, an oxygen sensor disposed within the exhaust stream downstream of the catalytic converter and a moisture sensor disposed within the exhaust stream.

The continuous biochar carbonizer also includes a control circuit. The control circuit is coupled to the at least one sensor, to the motor of the feedstock conveyor, to the motor of the blower and to the motor of the biochar conveyor. The control circuit repeatedly receives signals from the at least one sensor.

The control circuit also repeatedly compares the signals to a set of predetermined values to determine whether any of a set of trigger conditions is satisfied. Each trigger condition is associated with at least one of the feedstock conveyor, the blower and the biochar conveyor. If any of the set of trigger conditions is satisfied, the control circuit sends a signal to the motor of the associated feedstock conveyor, the motor of the associated blower and/or the motor of the associated biochar conveyor to alter speed of operation thereof. The set of predetermined values was selected to control quality of biochar delivered by the biochar conveyor to the biochar collection chamber and to balance production of the biochar and energy production by the engine.

The continuous biochar carbonizer may also include a motor-driven agitator disposed within the combustion chamber. The agitator may be coupled to the motor of the feedstock conveyor or a motor distinct from the motor of the feedstock conveyor. At least one of the set of trigger conditions is associated with the agitator. If any trigger condition associated with the agitator is satisfied, the control circuit sends a signal to the motor of the agitator to alter speed of operation of the motor.

The at least one sensor may include at least a temperature sensor disposed within the biochar collection chamber, a temperature sensor disposed within the combustion chamber and a temperature sensor disposed within the exhaust stream downstream of the catalytic converter.

If a temperature reported by the temperature sensor disposed within the exhaust stream downstream of the catalytic converter exceeds a first predetermined temperature, the control circuit may reduce the speed of operation of the agitator motor. If the temperature reported by the temperature sensor disposed within the exhaust stream downstream of the catalytic converter is less than a second predetermined temperature, the control circuit may increase the speed of operation of the agitator motor.

The first predetermined temperature may be about 700° C., and the second predetermined temperature may be about 400° C.

If a temperature reported by the temperature sensor disposed within the biochar collection chamber exceeds a third predetermined temperature, the control circuit may increases the speed of operation of the feedstock conveyor motor and decreases the speed of operation of the blower motor. If the temperature reported by the temperature sensor disposed within the biochar collection chamber is less than a fourth predetermined temperature, the control circuit may increases the speed of operation of the blower motor.

The third predetermined temperature may be about 400° C., and the fourth predetermined temperature may be about 350° C.

If a temperature reported by the temperature sensor disposed within the biochar collection chamber exceeds a fifth predetermined temperature, the control circuit may increase the speed of operation of the biochar conveyor motor. If the temperature reported by the temperature sensor disposed within the biochar collection chamber is less than a sixth predetermined temperature, the control circuit may decrease the speed of operation of the biochar conveyor motor.

The fifth predetermined temperature may be about 400° C., and the sixth predetermined temperature may be about 350° C.

If a temperature reported by the temperature sensor disposed within the combustion chamber is less than a seventh predetermined temperature, the control circuit may increase the speed of operation of the blower motor and decreases the speed of operation of the biochar conveyor motor. If the temperature reported by the temperature sensor disposed within the biochar collection chamber exceeds an eighth predetermined temperature, the control circuit may increases the speed of operation of the biochar conveyor motor and increases the speed of operation of the feedstock conveyor motor.

If the temperature reported by the temperature sensor disposed within the biochar collection chamber exceeds the eighth predetermined temperature, the control circuit may decrease the speed of operation of the blower motor.

The seventh predetermined temperature may be about 600° C., and the eighth predetermined temperature may be about 900° C.

If a temperature reported by the temperature sensor disposed within the biochar collection chamber is less than a ninth predetermined temperature, the control circuit may increase the speed of operation of the blower motor and decreases the speed of operation of the biochar conveyor motor. If the temperature reported by the temperature sensor disposed within the biochar collection chamber exceeds a tenth predetermined temperature, the control circuit may increase the speed of operation of the biochar conveyor motor and increase the speed of operation of the feedstock conveyor motor.

The ninth predetermined temperature may be about 400° C., and the tenth predetermined temperature may be about 600° C.

If the temperature reported by the temperature sensor disposed within the biochar collection chamber exceeds the tenth predetermined temperature, the control circuit may increase the speed of operation of the blower motor.

If an oxygen level reported by the oxygen sensor disposed within the exhaust stream downstream of the catalytic converter is less than an eleventh predetermined value, the control circuit may increase the speed of operation of the blower motor. If the oxygen level reported by the oxygen sensor disposed within the exhaust stream downstream of the catalytic converter exceeds a twelfth predetermined value, the control circuit may decrease the speed of operation of the blower motor.

The eleventh predetermined value may be about 2%, and the twelfth predetermined value may be about 3%.

The control circuit controls speed of operation of the biochar conveyor motor so as to maintain dwell time of the biochar in the combustion chamber between a thirteenth predetermined amount of time and fourteenth predetermined amount of time.

If a temperature reported by the temperature sensor disposed within the combustion chamber exceeds a fifteenth predetermined temperature, the control circuit may increase the speed of operation of the feedstock conveyor motor. If the temperature reported by the temperature sensor disposed within the combustion chamber is less than a sixteenth predetermined temperature, the control circuit may decrease the speed of operation of the feedstock conveyor motor.

The fifteenth predetermined temperature may be about 900° C.

If a temperature reported by the temperature sensor disposed within the combustion chamber is less than a seventeenth predetermined temperature, the control circuit may increase the speed of operation of the blower motor. If the temperature reported by the temperature sensor disposed within the combustion chamber exceeds an eighteenth predetermined temperature, the control circuit may decrease the speed of operation of the blower motor.

If a temperature reported by the temperature sensor disposed within the combustion chamber exceeds a nineteenth predetermined temperature, the control circuit may increase the speed of operation of the biochar conveyor motor. If the temperature reported by the temperature sensor disposed within the combustion chamber is less than a twentieth predetermined temperature, the control circuit may decrease the speed of operation of the biochar conveyor motor.

The nineteenth predetermined temperature may be about 600° C.

The continuous biochar carbonizer may also include a feedstock hopper. The feedstock conveyor may be coupled between the feedstock hopper and the combustion chamber. The continuous biochar carbonizer may also include a feedstock supplement hopper and a feedstock supplement conveyor. The feedstock supplement conveyor may be coupled between the feedstock supplement hopper and the feedstock hopper. The feedstock supplement conveyor and the feedstock conveyor may operate at relative speeds so as to deliver feedstock and feedstock supplement at a predetermined ratio to the combustion chamber.

The predetermined ratio may be about 25% feedstock supplement to feedstock.

The continuous biochar carbonizer may also include a heat exchanger disposed within the exhaust stream downstream of the engine.

The continuous biochar carbonizer may also include a second motor-driven blower communicably coupled between the fresh air supply and/or the exhaust stream and the biochar collection chamber to supply gas, from the fresh air supply and/or the exhaust stream, to the biochar collection chamber. The supplied gas may pressurize the biochar collection chamber, relative to the combustion chamber.

The at least one sensor may include a volatile gas sensor disposed within the biochar collection chamber. The control circuit may be coupled to the motor of the second blower to control speed of operation thereof. At least one of the set of trigger conditions may be associated with the second blower. If a volatile gas level reported by the volatile gas sensor disposed within the biochar collection chamber exceeds a twenty-first predetermined value, the control circuit may increase speed of operation of the second blower motor.

The biochar collection chamber may define a plurality of apertures that communicably couple the interior of the biochar collection chamber to the fresh air supply.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
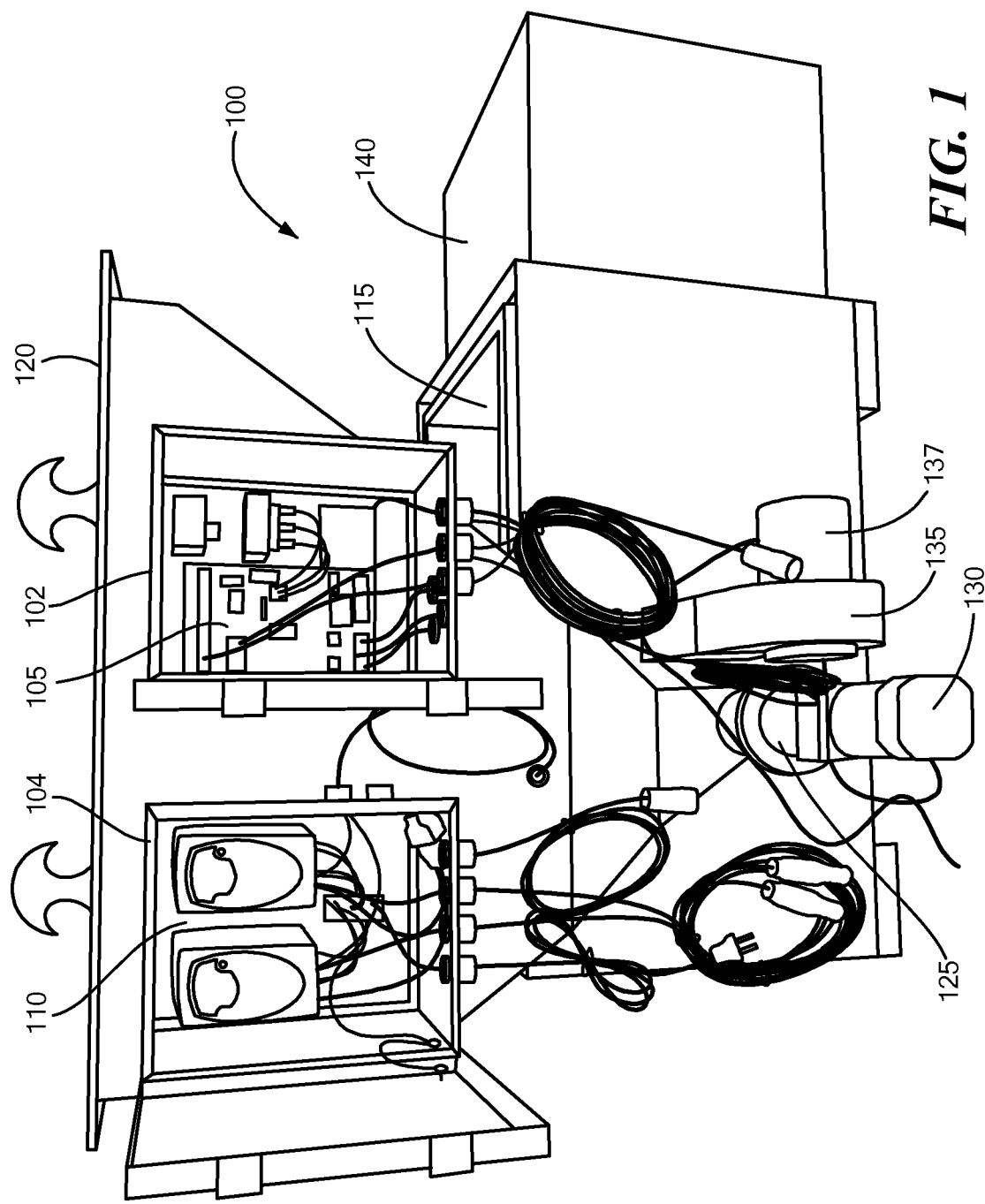
FIG. 1 is a front view of a continuous combined heat, power and biochar carbonizer that includes a control system, according to an embodiment of the present invention.

In accordance with embodiments of the present invention, methods and apparatus are disclosed for ventilating biochar produced by a biochar carbonizer to prevent the biochar from adsorbing, and therefore becoming contaminated with, volatile gases produced during pyrolysis. Adsorption is a process by which atoms, ions or molecules from a substance, in this case volatile gases, adhere to a surface of an adsorbent, which is in this case biochar. This disclosure includes a description of a controller for a continuous combined heat, power and ventilating biochar carbonizer, although other embodiments need not operate in a continuous fashion.

According to the present disclosure, the carbonizer pyrolyzes solid biofuels, such as wood chips, pellets, human waste, etc. The pyrolysis generates combustion gases. A catalytic converter combusts unburned components in the combustion gasses to generate additional thermal energy. The thermal energy from the combustion process drives an engine, such as a Sterling, steam, or organic Rankine cycle (ORC) engine, to generate electricity and/or operate a mechanical device. Remaining thermal energy is used to heat another medium, such as air or water, via a heat exchanger. The biofuel is intentionally incompletely pyrolyzed to generate biochar, a substance composed primarily of carbon and accounting for about 20-45% by weight of the initial biofuel. Some embodiments condense water from exhaust gasses to provide potable water or for use in the biochar production. Such embodiments may find utility in areas with scare potable water or water resources.

As the biochar is produced by the biochar carbonizer, the biochar is transported, such as by one or more augers from a pyrolysis pot to a biochar box, where the biochar accumulates. Occasionally or periodically during a production run, or at the end of the production run, some or all of the biochar may be removed from the biochar box. Because the pyrolysis pot and the biochar box are connected to each other, at least via holes in a wall through which the auger(s) extend(s), volatile gases generated by pyrolysis may enter the biochar box and contaminate the biochar, absent an embodiment of the present invention. In some embodiments, a blower pressurizes the biochar box to a pressure at least slightly greater than the pressure inside the pyrolysis pot, thereby preventing, or at least reducing, the amount of volatile gas infiltration from the pyrolysis pot into the biochar box. In some embodiments, the blower draws ambient air into the biochar box. In other embodiments, a blower draws exhaust gas from downstream of the catalytic converter into the biochar box. Exhaust gas downstream of the catalytic converter should contain little or no volatile gas, because the catalytic converter should have catalyzed the volatile gas produced during pyrolysis. U.S. Pat. No. 8,812,162, the entire contents of which are hereby incorporated by reference herein, includes a description of a biofuel-fired boiler that includes a catalytic converter in its exhaust path. In some embodiments, merely blowing ambient air or exhaust gas over the top of the biochar in the biochar box prevents volatile gases reaching the biochar, even if the volatile gases are present in the biochar box. In some embodiments, the blowers for some or all of these embodiments are controlled by a stand-alone controller or by a controller that also controls operations of the carbonizer components, as described herein. In some embodiments, air vents in the biochar box, such as apertures through wall(s) of the biochar box, facilitate passive ventilation of ambient air through the biochar box.

Operations within the device, such as pyrolysis of biofuel, maintaining a clean exhaust, producing biochar and operating the catalyst and operating an electrical generating engine and heat exchanger, pose competing requirements, particularly because composition of the biofuel may vary over time. The controller continuously, occasionally or periodically measures operating parameters, such as fire temperature, pre-catalyst (i.e. upstream of the catalyst) exhaust temperature, and post-catalyst (i.e. downstream of the catalyst) exhaust temperature, volatile gas level in the biochar box and/or exhaust and pre-catalyst and/or post-catalyst oxygen levels. Based on these measurements, the controller adjusts operational parameters of components of the device, such as the input air blower speed, feedstock auger speed, biochar box ventilation blower speed and the biochar extraction auger speed, so as to simultaneously meet the needs of all the subsystems and prevent unacceptable levels of volatile gases building up in the biochar box.

United States Environmental Protection Agency (EPA) regulations limit the amount of particulate matter, measured in grams per hour that may be emitted by a woodstove or wood-fired boiler. Catalytic converters are frequently used to clean the exhaust emissions from cord-wood or other biofuel-fired appliances. A catalytic converter essentially burns unburned biofuel (smoke) from the pyrolysis process before it exits a flue (smoke stack). Conventional catalytic converters often include ribbons of metal, typically thin (such as about 0.004 inch thick) stainless steel, that are coated with one or more catalysts.

Biochar

Pyrolysis is a thermal process that decomposes biomass in a low or no-oxygen environment to produce biochar, bio-oil and/or syngas. Based on the desired product, the pyrolysis conditions can be optimized to favor the production of a specific product, with fast, gasification, and slow pyrolysis optimizing bio-oil, syngas, and biochar production, respectively. To optimize biochar production, a slow pyrolysis technique is often employed using temperatures ranging from about 300° C. to about 750° C., heating rates of about 1-100° C./s and pyrolysis durations ranging from minutes to hours. Slow pyrolysis typically yields about 20-45% biochar and about 55-80% syngas/bio-oil, while fast and gasification pyrolysis often yield significantly less biochar, often less than about 20%. Regardless of the pyrolysis technique used, once initialized, all processes produce net energy. For typical inputs, the energy required to run a "fast" pyrolyzer is about 15% of the energy that it outputs. Modern pyrolysis plants can use the syngas created by the pyrolysis process and output about three to nine times the amount of energy required to run.

As biochar is produced under a negligible or limited supply of oxygen, by definition, feedstocks in carbonizers undergo incomplete combustion. Consequently, carbonizers potentially emit high levels of particulate matter and other pollutants. The "Amazonian" pit/trench method for producing biochar, i.e., burning biomass in a trench and covering it with dirt, harvests neither the produced bio-oil nor syngas, and it releases a large amount of CO, particulate matter, and other toxins into the atmosphere. In contrast, commercial-scale biochar production carbonizers are capable of processing a variety of biomass feedstocks and producing biochar while capturing the bio-oil and syngas produced and maintaining low emissions.

There are various ways in which a community can set up a carbonizer for biochar production. In a centralized system, all biomass in a region is brought to a central plant for processing. Alternatively, each farmer or group of farmers can operate a lower-tech kiln. The produced biochar is typically harvested for soil amendment, while the bio-oil and syngas is often used to generate heat and electricity for the individual/community while powering the system. Based on the desired products (e.g. biochar, bio-oil, or producing electricity to feed into the power grid) the choice of carbonizer can vary.

For crops that are not exclusively grown for biochar production, biochar residue-to-product ratio (RPR) and collection factor (CF), i.e., the percent of the residue not used for other things, measure an approximate amount of feedstock that can be obtained for pyrolysis after harvesting the primary product. For instance, Brazil harvests approximately 460 million tons (MT) of sugarcane annually, with an RPR of about 0.30, and a CF of about 0.70 for the sugarcane tops, which normally are burned in the field. This translates into approximately 100 MT of residue annually which could be pyrolyzed to create energy and soil additives. Adding in bagasse (sugarcane waste) (RPR=0.29 CF=1.0) or vinasse, which is otherwise typically inefficiently burned in boilers, raises the total to about 230 MT of pyrolysis feedstock. Some plant residue must, however, remain on the soil to avoid increased costs and emissions from nitrogen fertilizers.

Although the results vary widely, studies have also shown that biochar addition to soil can improve the soil's water retention, pH (potential substitute for agricultural lime), cation exchange capacity, nutrient retention, and soil biota, while reducing soil emissions. However, it is known that pyrolysis temperature, pyrolysis duration, initial feedstock, amount of biochar added and initial chemical composition of the soil all impact biochar's ability to positively impact the soil and crop yield. Regional conditions, temperature, and humidity can also affect biochars effectiveness. Due to biochar's adsorption capabilities, biochar can also be used in place of a low-grade activated carbon and is capable of filtering out both organic and inorganic contaminants.

Biochar impact may also depend on regional conditions, including soil type, soil condition (depleted or healthy), temperature and humidity.

Pollutants such as metals and pesticides seep into soil and contaminate food supplies, reducing the amount of land suitable for agricultural production. Studies have reported positive effects from biochar on addition to soils positively impacts crop production in degraded, nutrient-poor, and polluted soils. Through varying the pyrolysis conditions and feedstock biochar can be tailored to meet the specific needs these nutrient poor or polluted soils. In addition, biochar reduces leaching of soil nutrients, creates a higher crop uptake of nutrients and provides greater soil availability of nutrients. At about 10% levels, biochar reduced contaminant levels in plants by up to about 80%, while reducing total chlordane and DDX content in the plants by about 68% and 79%, respectively. However, in all of these applications "clean" biochar, i.e., biochar that has not adsorbed volatile gases, should be used. Otherwise, the biochar may not be able to adsorb contaminants from the soil and may, instead, contribute to contamination of the soil. On the other hand, due to its high adsorption capacity, biochar may reduce the efficacy of soil-applied herbicides and pesticides that are needed for weed and pest control. High surface area biochars may be particularly problematic in this regard.

Biochar is a desirable soil additive in many applications due to its ability to retain water due to its porous structure and high surface area. As a result, water, nutrients, and agrochemicals are retained in the soil for the plants' benefit. Plants therefore, are healthier and fertilizers leach less into surface or groundwater.

Bio-oil can be used as a replacement in numerous applications where fuel oil is used, including fueling space heaters, furnaces, and boilers. Additionally, these biofuels can be used to fuel combustion turbines and reciprocating engines, and as a source to create several chemicals. If bio-oil is used without modification, care must be taken to prevent emissions of black carbon and other particulates. Syngas and bio-oil can also be "upgraded" to transportation feedstocks biofuels such as biodiesel and gasoline substitutes. If biochar is used for producing energy, rather than as a soil amendment, it can be directly substituted for any application that uses coal. Pyrolysis may be the most cost-effective way of producing electrical energy from biomaterial. Syngas can be combusted directly, used as a biofuel for gas engines and turbines, converted to clean diesel biofuel through the Fischer-Tropsch process or potentially used in the production of methanol and hydrogen.

Bio-oil has a higher energy density than raw biomass. Mobile pyrolysis units can be used to lower the transportation costs of the biomass if the biochar is returned to the soil and the syngas is used to power the process. Bio-oil contains organic acids that are corrosive to steel containers, has a high water vapor content that is detrimental to ignition, and, unless carefully cleaned, contains some biochar particles which can block injectors. The greatest potential for bio-oil seems to be its use in a bio-refinery, where compounds that are valuable chemicals, pesticides, pharmaceuticals or food additives are first extracted, and the remainder can be either upgraded to biofuel or reformed to syngas.

Cogeneration of Heat and Power

Cogeneration of heat and power (CHP) units for generating more than about one megawatt (MW) of electricity have been known for many years. Recent advances in MicroCHP (mCHP) are focused on units that generate less than about one megawatt of electrical power. Biochar and charcoal have also been made for thousands of years. Traditionally, biochar and charcoal have been made in batch mode, either by burying feedstock in the ground or using kilns. Oxygen needs to be minimized in the batch process to keep the feedstock from turning to ash. The making of charcoal and biochar has historically been associated with high particulate and CO emissions. Embodiments of the present invention make biochar through the continuous auguring of feedstock into a pyrolysis pot and controlling the emissions using a catalyst and other methods. These and other embodiments use excess heat to generate power and then using the remaining heat for thermal heating applications.

As used herein, "continuous" means pyrolysis is not limited to its initial bolus of feedstock in the pyrolysis chamber. In a continuous system, feedstock not undergoing pyrolysis is stored relatively close to, typically within about ten feet of, the carbonizer, but in such a manner that it cannot pyrolyze, such as in a feedstock hopper distinct from the combustion chamber. Portions of the stored feedstock are fed into the carbonizer as needed to provide a relatively steady pyrolysis process. The feedstock is fed into the carbonizer by a mechanical conveyor, such as an auger or a conveyor belt. The mechanical device can operate intermittently or continuously, to keep the carbonizer supplied with feedstock to pyrolyze. Optionally, additional feedstock may be added to the feedstock storage, as the stored feedstock is depleted. The carbonizer continues to pyrolyze newly fed feedstock after the initial bolus of feedstock has been consumed.

Continuous pyrolysis is distinct from batch pyrolysis. In batch pyrolysis, a bolus of feedstock (not counting "starter feedstock" that may be used to start the pyrolysis process) is provided, and at least a portion of the bolus is ignited. Pyrolysis spreads through the batch, but no additional feedstock is added while the pyrolysis occurs. Once the initial bolus of feedstock has undergone pyrolysis, the pyrolysis process ceases, and another batch of feedstock can then be pyrolyzed by repeating the process.

As used herein, the term "continuous" includes what might be termed "semi-continuous" in other contexts, i.e., a process that proceeds for a length of time, longer than a single bolus of feedstock would support, but ends at some time, i.e., not necessarily continuing ad infinitum.

The temperature at which biochar undergoes pyrolysis affects both yield and quality of the biochar. In general, higher peak pyrolysis temperatures yield less biochar than lower peak pyrolysis temperatures, because hydrogen, nitrogen and oxygen present in the feedstock are released via the gaseous phase. As the peak pyrolysis temperature increases, alkalinity of the biochar also increases. As temperature increases, biochar's adsorption capabilities and surface area increase, allowing biochar to more effectively filter out and/or uptake contaminants. Management of the biochar yield and adsorption quality can have a large impact on total production and profits. High quality products can have a market price one hundred times the price of lower quality products, ash being the lowest quality. On the other hand, biochars with adsorption levels close to that of activated carbon are considered to be of the highest quality.

Physical Components

This section describes physical components of a biochar carbonizer and a controller, and a subsequent section describes how the controller works, according to embodiments of the present invention. FIG. 1 is a front view of a continuous combined heat, power and biochar carbonizer 100, according to an embodiment of the present invention. The carbonizer 100 includes a control system, major components of which are mounted inside two cabinets 102 and 104. A controller circuit board 105 is mounted inside the right-hand cabinet 102, and two electric motor speed controllers 110 are mounted inside the left-hand cabinet 104. The motor speed controllers 110 may be, for example, variable frequency speed controllers for three-phase electric motors. The motor speed controllers 110 are electrically connected to the controller circuit board 105 and are controlled by a processor on the controller circuit board 105.

The carbonizer 100 defines an enclosed combustion chamber 115, which is shown with its cover removed for clarity. The carbonizer 100 includes a generally funnelshaped feedstock hopper 120. The bottom of the feedstock hopper 120 feeds into a feedstock tube 125. A feedstock feed auger (not visible) is disposed within the feedstock feed tube 125 and is driven by a motor 130 to feed feedstock from the hopper into the combustion chamber 115. In one embodiment, the motor 130 is a three-phase motor connected to one of the motor speed controllers 110 to control speed of the feedstock auger 305 and, therefore, speed at which feedstock is fed from the feedstock hopper 120, through the feedstock tube 125, into the combustion chamber 115.

A blower 135 feeds fresh air into the combustion chamber 115. The blower 135 can be driven by a single-phase motor 137, whose speed is controlled by a third motor speed controller mounted in one of the two cabinets 102 of 104 and electrically connected to the controller circuit board 105. An enclosed biochar extraction box 140 collects biochar produced by the carbonizer 100.

Figure 2:
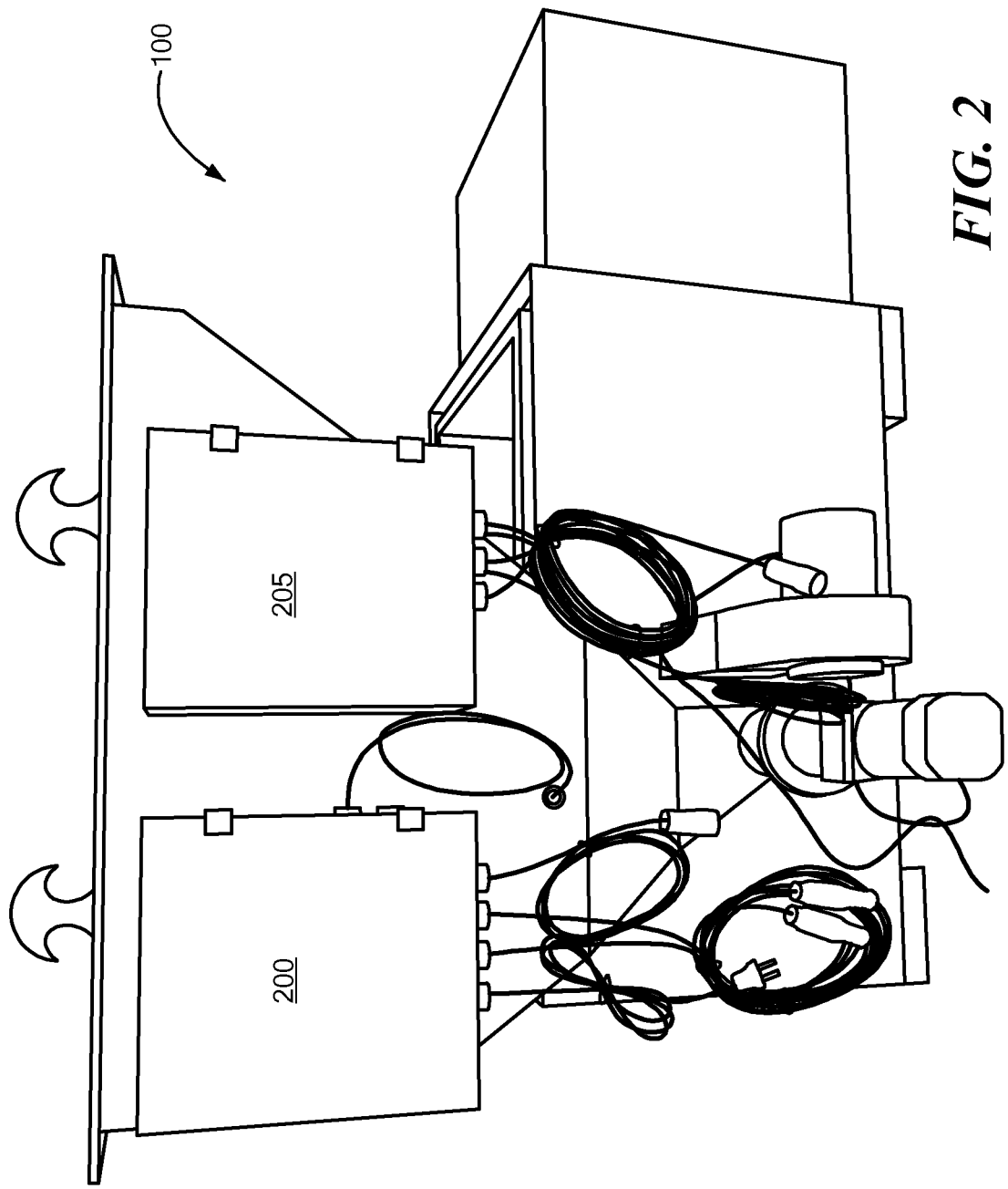
FIG. 2 is a front view of a portion of the continuous combined heat, power and biochar carbonizer of FIG. 1, with housing doors to the control system closed.

FIG. 2 is a front view of a portion of the continuous combined heat, power and biochar carbonizer 100, with housing doors 200 and 205 to the control system closed.

Figure 3:
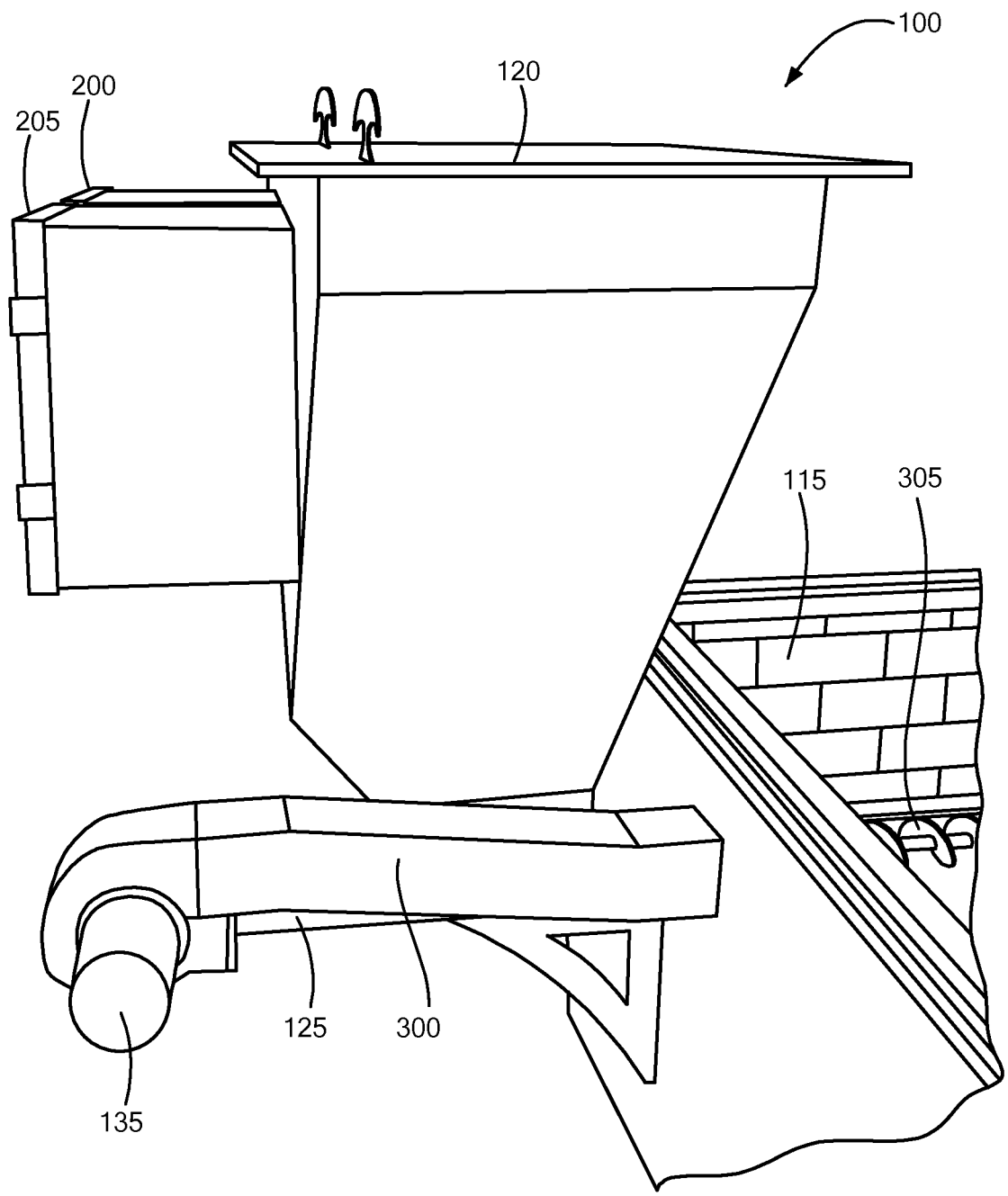
FIG. 3 is a side view of a portion of the continuous combined heat, power and biochar carbonizer of FIG. 1, including a side view of the control system housing and feedstock hopper and feedstock inlet.

FIG. 3 is a side view of a portion of the continuous combined heat, power and biochar carbonizer 100. The feedstock hopper 120 is better seen in FIG. 3. An air inlet 300 extends from the blower 135 to the combustion chamber 115. The feedstock tube 125 extends behind (in the view provided by FIG. 3) the air inlet 300. A portion of the feedstock auger 305 can be seen inside the combustion chamber 115. It should be noted that feedstock and air are fed into the combustion chamber 115 via separate tubes 125 and 300, respectively. More importantly, the speed at which the feedstock and the air are fed into the combustion chamber 115 are separately controllable, because each speed is determined by a different motor 130 and 137, respectively. Because the two motors 130 and 137 are controlled separately by the controller circuit board 105, the controller 105 can continuously adjust the feedstock/air ratio.

Figure 4:
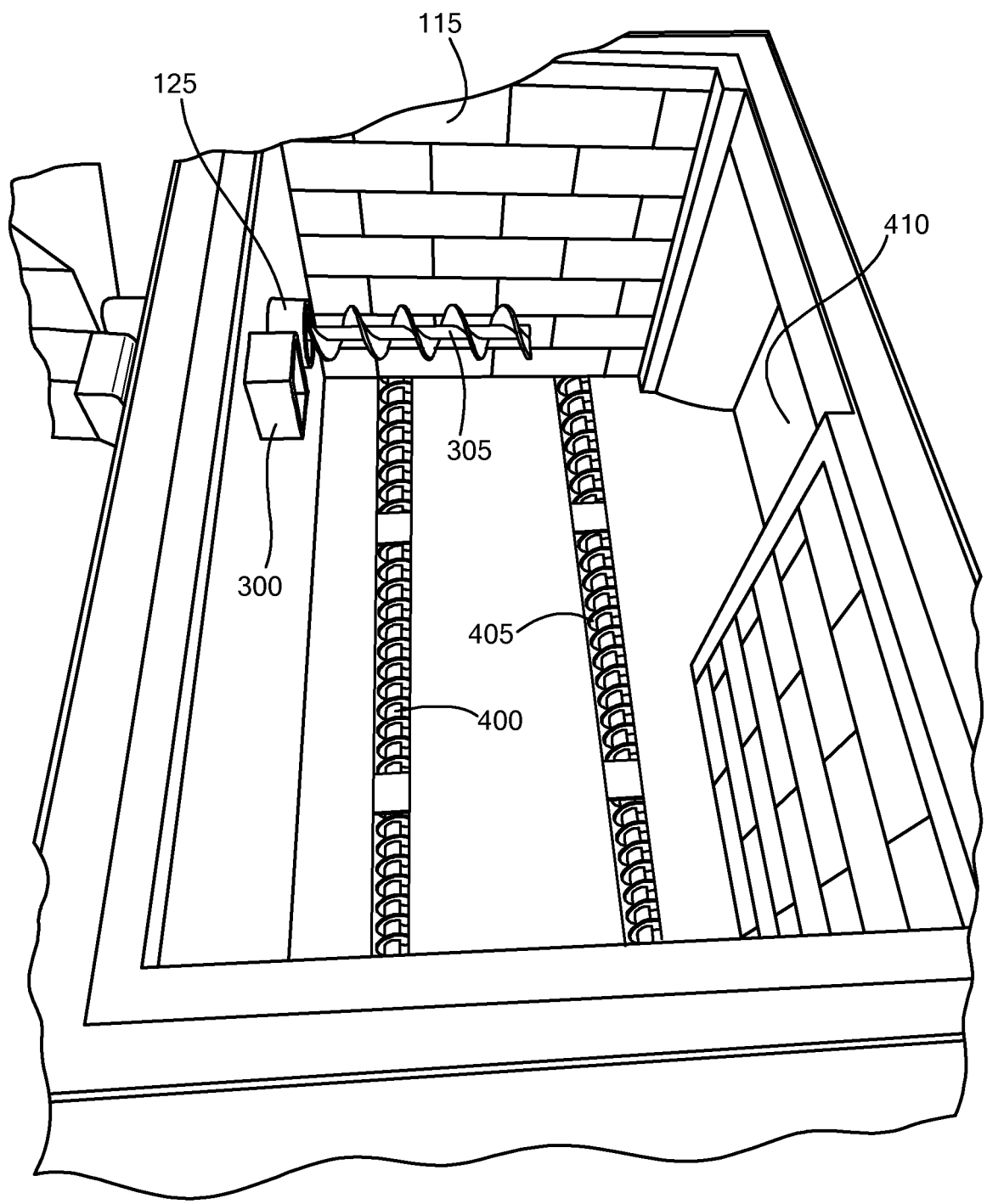
FIG. 4 is a perspective/top view, with a top cover removed, of the inside of the continuous combined heat, power and biochar carbonizer of FIG. 1, including feedstock feed auger, air inlet and two biochar out-feed augers, but with a fire pot removed.

FIG. 4 is a perspective view from above of the inside of the combustion chamber 115, with the cover of the combustion chamber removed for clarity. A pyrolysis pot (not shown), normally disposed inside the combustion chamber 115, is removed for clarity. A distal end of the feedstock tube 125, a distal end of the feedstock auger 305 and a distal end of the air inlet 300 are visible. Two biochar extraction augers 400 and 405 are disposed at the bottom of the combustion chamber 115. A door 410 to the combustion chamber 115 is shown in an open position.

Figure 5:
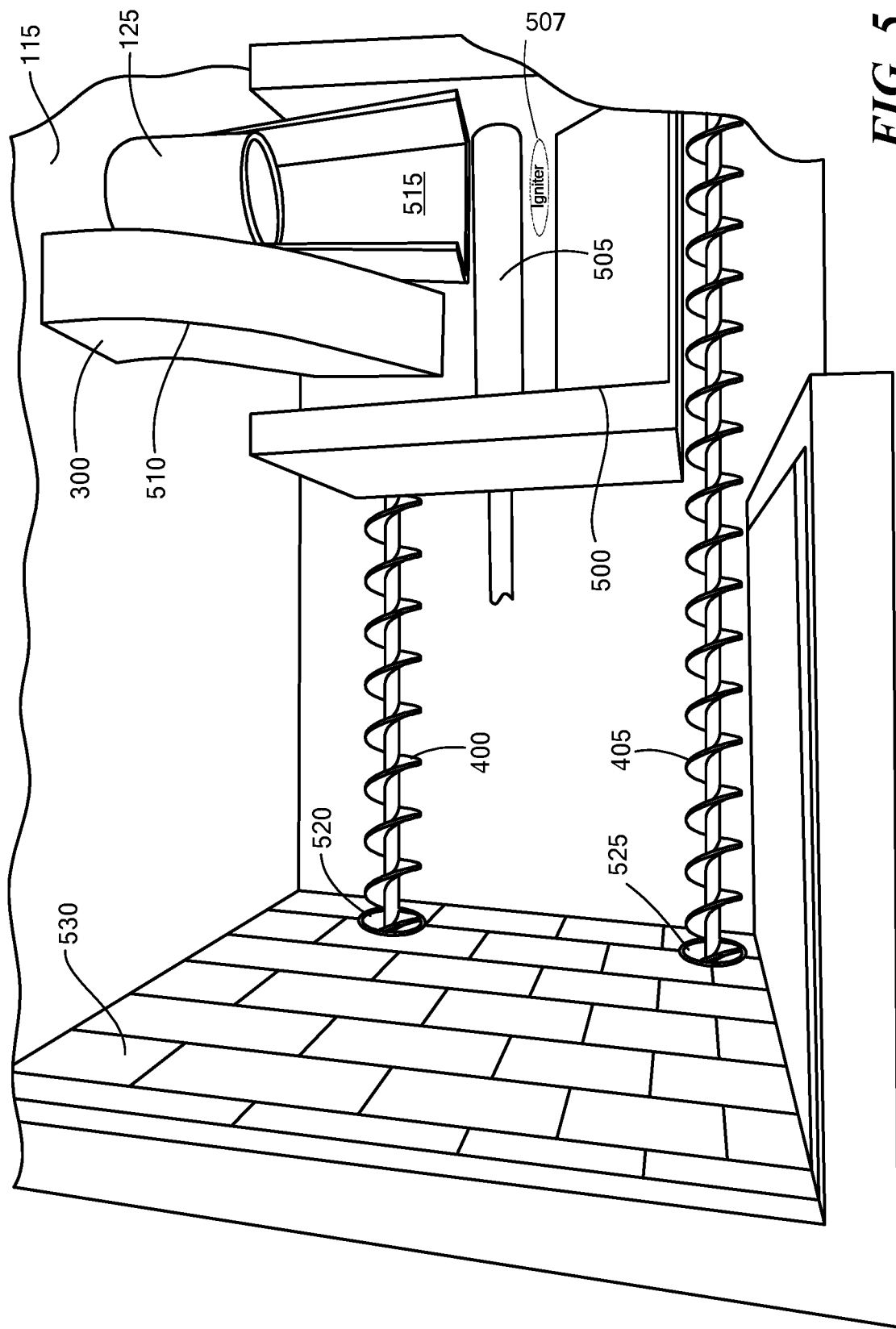
FIG. 5 is a top view, with the cover removed, of the inside of the continuous combined heat, power and biochar carbonizer of FIG. 1. The view is similar to that provided in FIG. 4, except a pyrolysis pot is in place, and deflectors are attached to the feedstock feed auger and the air inlet.

FIG. 5 is a top view, with the cover removed, of the inside of the combustion chamber 115. The pyrolysis pot 500 is shown in this view. The pyrolysis pot 500 includes a mechanical agitator 505. A generally downward aiming air deflector 510 is shown attached to the distal end of the air inlet 300. A feedstock distribution pan 515 is shown attached to the distal end of the feedstock tube 125. The feedstock distribution pan 515 spreads the feedstock across its lateral extent, thereby drying the feedstock before it is deposited into the pyrolysis pot 500. The biochar extraction augers 400 and 405 extend through passage 520 and 525, respectively, in a left wall 530 of the combustion chamber 115, into the biochar extraction box 140 (not visible).

Figure 6:
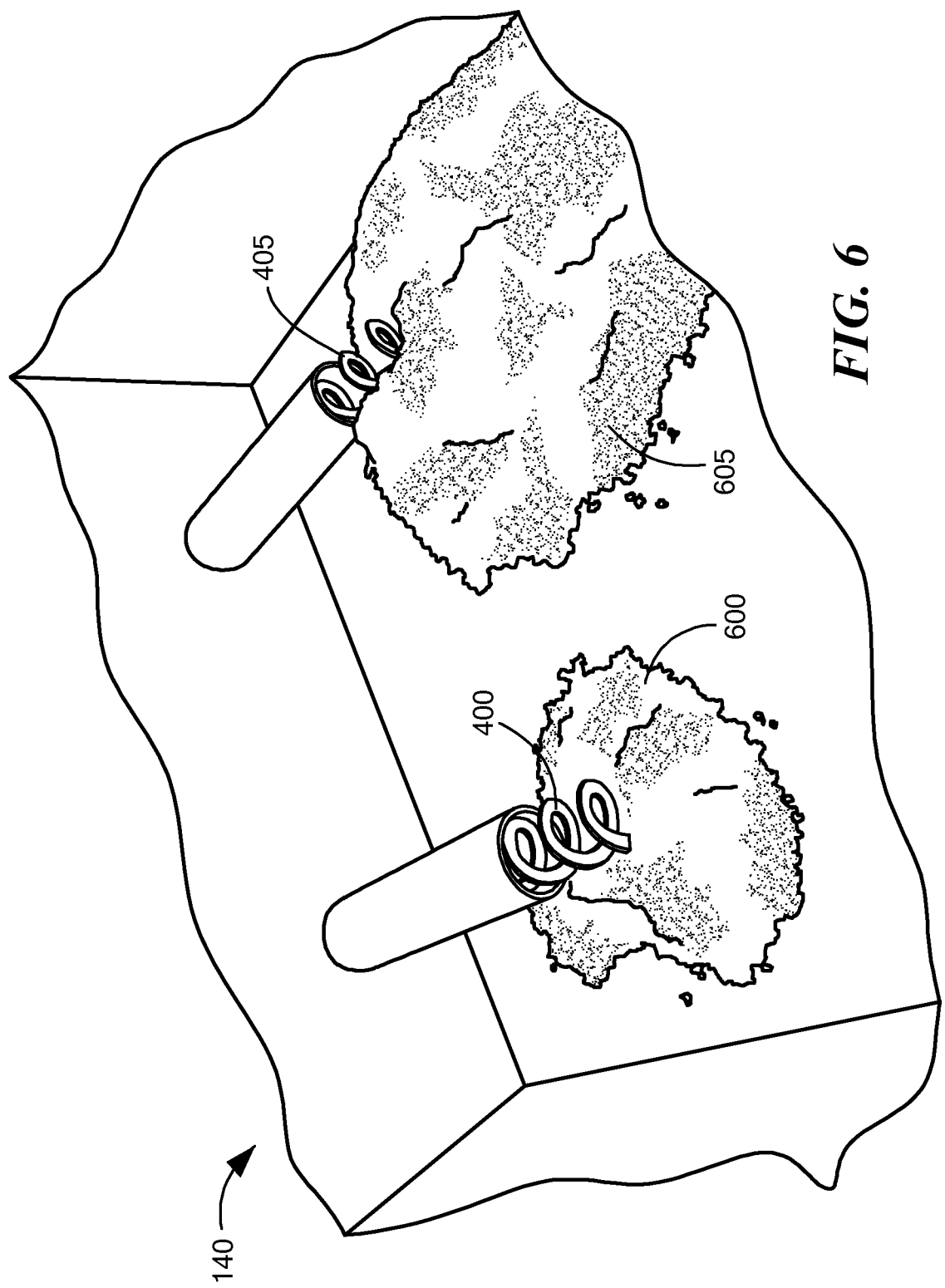
FIG. 6 is an inside view of the biochar box and a perspective view of distal ends of the biochar out-feed augers of the continuous combined heat, power and biochar carbonizer of FIG. 1.

FIG. 6 is a perspective view of distal ends of the biochar extraction augers 400 and 405 in the biochar extraction box 140. Small amounts of biochar produced by the carbonizer 100 are shown at 600 and 605.

Figure 7:
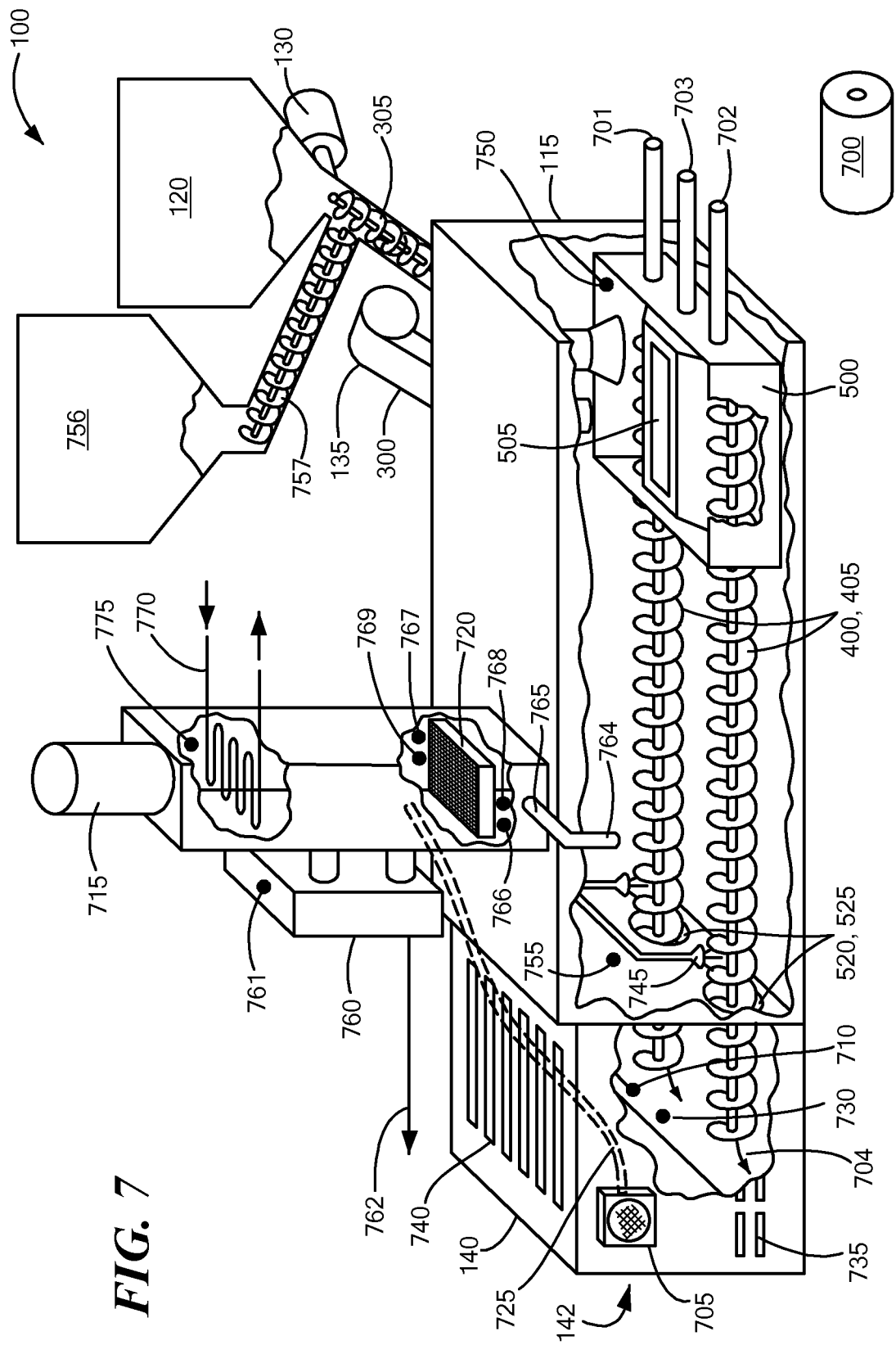
FIG. 7 is a schematic diagram of the of the continuous combined heat, power and biochar carbonizer of FIG. 1, according to an embodiment of the present invention.
Figure 8:
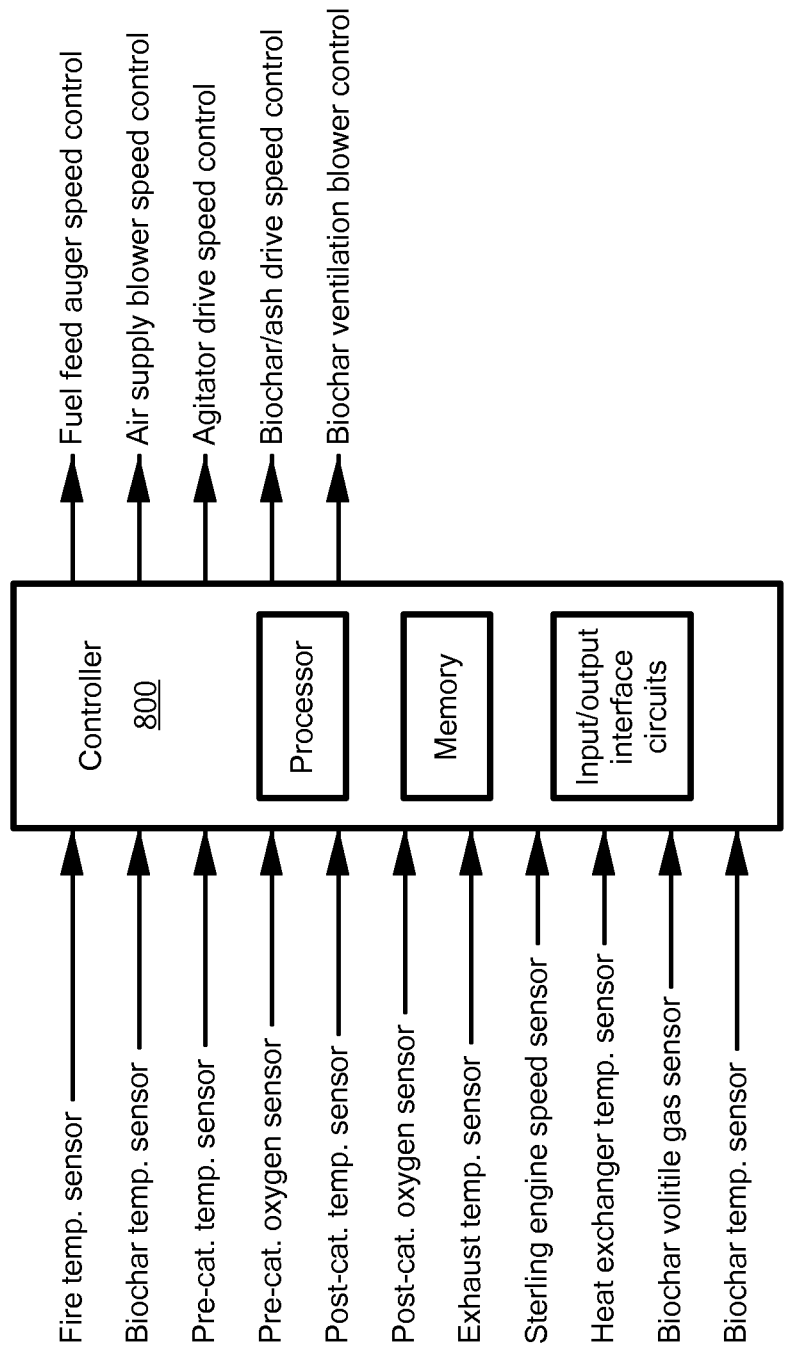
FIG. 8 is a schematic block diagram of a controller the of the continuous combined heat, power and biochar carbonizer of FIG. 1, according to an embodiment of the present invention.

FIG. 7 is a schematic diagram of the combined heat, power and biochar carbonizer 100, and FIG. 8 is a schematic block diagram of a controller 800 of the carbonizer 100. FIG. 7 shows a motor 700, such as a variable speed three-phase motor, mechanically coupled to the biochar/ash augers 400 and 405 and to the pyrolysis agitator 505. Although two biochar augers 400 and 405 are shown, any appropriate number of augers may be used. Appropriate gears, belts and pulleys or the like (not shown) may be used to mechanically couple the motor 700 to the augers 400/405 and to the agitator 505 drive shafts 701, 702, and 703. The gears, belts, pulleys, etc. may drive the augers 400-405 at a desired speed ratio, relative to the agitator 505. As noted, the augers 400-405 deliver biochar 704 to the biochar extraction box 140.

Biochar Ventilation

In most cases, it is impossible or impractical to make the passages 520 and 525, through which the augers 400 and 405 extend between the pyrolysis pot 500 and the biochar box 140, air tight. Consequently, absent methods and systems described herein, volatile gases produced in the pyrolysis pot 500 can enter the biochar box 140 and contaminate biochar stored therein. In some embodiments, a biochar ventilation blower 705 draws ambient fresh air into the biochar box 140, sufficient to at least slightly pressurize the biochar box 140, relative to the pyrolysis pot 500. A pressure difference of at least about 0.1 atmospheres is sufficient in most cases. However, a desired or necessary pressure differential may be determined empirically.

In some embodiments, a volatile gas sensor 710 disposed within the biochar box 140 measures levels of volatile gases, and a controller, such as the controller 800 (FIG. 8) or a stand-alone controller (not shown), controls operation of the biochar ventilation blower 705 so as to prevent more than a predetermined level of volatile gas in the biochar box 140. If the sensor 710 and controller 800 detect more than a predetermined amount of volatile gas in the biochar box 140, the controller 800 activates or speeds up the biochar ventilation blower 705. If the blower 705 is already operating at a maximum speed, and the sensor 710 and controller 800 detect more than the predetermined amount of volatile gas in the biochar box 140, the controller 800 may raise an alert, and then an alarm, increasing airflow from the blower 135 into the pyrolysis pot 500 to purge the volatile gases via the exhaust stack 715 and/or slow down or cease the pyrolysis operation.

In some embodiments, a portion of the exhaust gas taken from a location downstream of the catalytic converter 720, is used to pressurize the biochar box 140. An exhaust gas re-circulating pipe 725 may be used to conduct the exhaust gas from the location downstream of the catalytic converter 720. In most cases, a blower, such as blower 705, may be necessary to draw the exhaust gas and inject it into the biochar box 140.

The exhaust gas should have relatively small oxygen content, as discussed herein. Using exhaust gas to pressurize the biochar box 140 prevents or inhibits the biochar in the box 140 from burning, thereby maintaining a desired unburned fraction of the biochar. Some embodiments dispose a temperature sensor 730 in the biochar box 140, and the controller 800 controls the biochar ventilation blower 705 in part based on temperature within the biochar box 140. If the temperature exceeds a predetermined threshold, the controller may cause the blower to activate or speed up, so as to cool biochar with ambient air or to increase the amount of exhaust gas (which presumably has little oxygen) introduced into the box 140. In some embodiments, a combination of ambient air and exhaust gas is used to pressurize the biochar box 140.

In embodiments that pressurize the biochar box 140, the box 140 and any access door 142 to the box 140 should be relatively air tight, although as noted, the passage(s) 520 and 525 through which the auger(s) 400-405 pass(es) can have an air lock but may not be able to be made air tight. In some embodiments, the passage(s) 520 and 525 through which the auger(s) 400-405 pass(es) include air locks (not shown).

In some embodiments, the biochar box 140 defines a plurality of vent apertures 735 through walls of the box 140. Such vents 735 may facilitate passive ventilation of the biochar box 140, thereby avoiding a need for the blower 705. As shown in FIG. 7, a set of intake biochar vents 735 may allow ambient air to enter the biochar box 140, and a set exhaust biochar vents 740 may allow gases to escape from within the biochar box 140. The intake vents 735 may be located on a lower portion of the biochar box 140, whereas the exhaust vents 740 may be located on an upper portion of the biochar box 140. Heat from the biochar may drive a natural convection current from the intake vents 735 to the exhaust vents 740.

In some embodiments, the intake vents 735 may be replaced or augmented by an exhaust blower (not shown), sometimes known as an induction fan, that exhausts gas from within the biochar box 140, thereby creating negative pressure relative to ambient, thereby drawing in ambient air through the intake vents 735. In these cases, the exhaust vents 740 are optional.

Optionally, one or more sprayers, exemplified by sprayer 745 may be disposed within the combustion chamber 115, such as proximate the pyrolysis pot 500 and/or above the biochar augers 400-405, and connected to a source of water, urine or other fluid. The fluid may be sprayed on the biochar as it is being transported within the combustion chamber 115 or the pyrolysis pot 500, toward the biochar box 140, to stop the pyrolysis of the biochar. In some embodiments, the fluid is water condensed from the exhaust gas.

Various sensors, such as a pyrolysis temperature sensor 750 and a biochar temperature sensor 755, etc. (FIG. 7), are electrically connected to ports of the controller 800 (FIG. 8). The controller 800 corresponds to the control circuit board 105 (FIG. 1). The ports may include any suitable interface, such as screw terminals, plugs, sockets, wireless interfaces (such as Bluetooth wireless interfaces), by which the sensors, motors, dampers, etc. of the carbonizer 100 may be electrically connected to the controller 800. Input/output interface circuits include the ports. The controller 800 includes a control processor and a memory and the input/output interface circuits.

The memory stores instructions of a control program, such as rules and threshold values, and the processor executes the instructions. The control program causes the processor and input/output interface circuits to read data provided by the sensors, compare the data to various thresholds and times and generate control signals, all according to program logic as described in more detail herein. The control signals may include a feedstock auger speed control signal, an air supply blower speed control signal, a biochar ventilation blower on/off or speed control signal, etc. These control signals control operation of the motors, such as the feedstock auger motor 130 and a motor in the blower 135. In embodiments in which the motors require external speed controllers, for example if the motors are 3-phase motors, appropriate speed controllers are included, as indicated at 110 (FIG. 1).

Feedstock Hopper

Various feedstocks, such as wood pellets, grass pellets, wood chips, cherry pits, walnut hulls, rice hulls, manure and/or human waste, are fed into the feedstock hopper 120. Feedstock moisture levels can vary from as low as about 2% to as high as 50% or more.

Feedstock Auger

At the bottom of the feedstock hopper 120 is a feedstock auger 305 (see FIGS. 3 and 4) driven by a variable speed or single speed feedstock motor 130. The feedstock motor 130 augers the feedstock into combustion chamber 115, such as into the carbonizer pot 500.

Feedstock Supplement Hopper and Auger

Some feedstock contaminants, such as sand, and some feedstock components, such as sugar, can create hard "clinkers" when heated in the combustion chamber 115. Clinkers are also known as klinkers or sinters, and the process of creating clinkers is sometimes referred to as sintering. Clinkers can jam or load the biochar extraction augers 400-405. When using feedstock that tends to produce clinkers, a supplement, such as lime or wood pellets, may be added to the feedstock at a predetermined rate, such as about 25%, to prevent or reduce clinker production.

As shown in FIG. 7, a second hopper 756 (a "feedstock supplement hopper") may be included to hold the feedstock supplement, and a feedstock supplement auger 757 may be included to deliver the feedstock supplement to the feedstock hopper 120 or another point along the feed line of feedstock from the feedstock hopper 120 to the combustion chamber 115. The feedstock supplement auger 757 may be driven by the feedstock auger motor 130, such as via a belt and pulley or gear arrangement (not shown), to drive the feedstock supplement auger 757 at a fixed fraction of the feedstock auger 305 speed, or the feedstock supplement auger 757 may be driven by its own motor (not shown). A feedstock supplement auger motor's speed may be controlled by the controller 800, as described herein, with respect to the other motors 130, 700, etc.

Pyrolysis Blower

Air is delivered to the pyrolysis process driven by a blower 135 that is attached to the air tube 300.

Pyrolysis Temperature Sensor

In the carbonizer pot 500 or pyrolysis chamber 115, a pyrolysis temperature sensor 750, such as a K-type thermocouple from Omega, is inserted to determine pyrolysis temperature.

Char/Feedstock Agitator and Biochar Extraction Auger

In the carbonizer pot 500 an agitator 505 agitates the carbonizer pot to migrate the pyrolyzing feedstock toward the biochar extraction augers 400 and 405. The char/feedstock agitator 505 may, but need not, be connected to the biochar extraction augers 400 and 405 by a chain and sprockets of appropriate sizes to determine a speed ratio between the char/feedstock agitator 505 and the biochar extraction augers 400 and 405, so the char/feedstock agitator 505 can be driven by the same motor 700 as drives the biochar extraction augers. Alternatively, a separate motor (not shown) may drive the char/feedstock agitator 505. One or more variable speed three-phase or single-phase motor(s) powers the biochar extraction augers 400 and 405.

Biochar Box

The biochar collection box 140 is a metal box where the biochar extraction augers 400 and 405 deliver organic and non-organic material 600 and 605 (FIG. 6).

Biochar Temperature Sensor

An optional temperature probe 755, such as an Omega K-type thermocouple, may be attached near the char extraction box 140 to measure the biochar temperature 600 and 605 as it exits from the biochar extraction augers 400 and 405.

Engine Heat Exchanger

Heat from the burning feedstock rises through a stack 715 (FIG. 7). The stack 715 includes a metal substrate catalyst 720. Some of the heat from the pyrolysis, and heat from secondary combustion due to the catalyst 720, enter into, or otherwise drive, an engine 760. The engine 760 may be an engine that uses direct heat, such as an electric generation engine, or an engine that uses heated fluid, such as water or glycol, to move a piston, turn a power shaft or a turbine to generate physical rotary mechanical or electrical power. The engine 760 may be a steam engine or a steam generator.

Mechanical power can be used to drive a generator or alternator to generate electrical power. Mechanical energy being supplied by engine 760 is indicated at 762. Optionally or alternatively, the engine 760 may be another device that converts heat into electrical or mechanical power. In one embodiment, the engine includes a thermoelectric generator. Some or all of the electrical power generated may be stored in a battery (not shown), which is used to power the controller 800, motors and other electrical components of the carbonizer 100.

Engine RPM Sensor

Attached to a flywheel of the engine is a magnet. When the flywheel rotates, the magnet passes by a sensor 761 coupled to the processor, enabling the processor to count flywheel revolutions and, thereby, calculate flywheel rotation rate, such as in revolutions per minute (RPM).

Engine Output Meter

The engine may need an input, such as 24V from a battery or an external power supply, to start the engine. After the engine begins to operate, a meter or sensor measures electrical or shaft power output of the engine.

Catalyst Thermocouple(s)

Above the catalyst is a thermocouple probe, such as a K-type from Omega, which is used to measure the input temperature into the engine. An optional sensor may be disposed upstream of the catalyst to measure temperature pre-catalyst.

Oxygen Sensor(s)

Above the catalyst is an oxygen sensor, such as a Bosch LSM11 or LSU4.9, to measure post-catalyst oxygen levels. An optional sensor may also be used to measure oxygen pre-catalyst.

Secondary Air Supply

Below the catalyst 720 is one or more tube(s), one of which is visible at 765, that admit secondary air into the stack 715. In some embodiments, the tube(s) 765 may be about 2 inches in diameter. However, in other embodiments, other sizes of tube(s) 765 may be used. Inlets 764 of the tube(s) 765 should be lower than where the tube(s) 765 admits the secondary air into the stack 715. Otherwise, smoke may "puff" from the inlets of the tube(s) 765. Placing the tube inlets lower than where they admit the secondary air creates a negative pressure at the inlets, thereby drawing in air, and preventing "puffing." Similarly, the tube(s) 765 should be long enough to prevent "puffing." The length of the tube(s) 765 can be determined experimentally, given other parameters of the carbonizer 100.

Catalyst Blower

Attached to the secondary air tubes, an optional variable speed or single speed blower (not shown) may be installed to increase and better manage the oxygen levels below the catalyst. The blower may be coupled to the controller 800, so speed of the blower may be controlled by the controller 800.

Catalyst Heater

Below the catalyst 720, an optional electric or gas heater (not visible) may be used to help bring the catalyst 720 to an operation temperature of between about 260° C. and about 315° C., prior to burning the biofuel, or if the catalyst temperature falls below a predetermined value while the carbonizer 100 operates. Control of such a catalyst preheater is described in U.S. Pat. No. 8,812,162, titled "Intelligently-Controlled Catalytic Converter for Biofuel-Fired Boiler," the entire contents of which are hereby incorporated by reference herein. Temperature of exhaust gasses before and after the catalyst 720, i.e., upstream and downstream of the catalyst 720, may be measured by respective temperature sensors 766 and 767, respectively. Similarly, oxygen levels in exhaust gasses before and after the catalyst 720 may be measured by oxygen sensors 768 and 769, respectively.

Co-Generation Heat Exchanger

After the hot gases pass the engine 760, they pass through an air or fluid heat exchanger 770. Output from the heat exchanger 770 provides heat to a dwelling, potable water, greenhouse or other use.

Exhaust Temperature Sensor

After the co-generation heat exchanger, a temperature probe 775, such as an Omega K-type thermocouple, is installed in the exhaust pipe 715.

Controller Operation

The controller 800 implements a state machine. Each state represents a condition of the carbonizer 100. The controller 800 implements rules, under which the state of the carbonizer 100 can change from one state to another state. Other rules indicate how the motors, fans, etc. should operate, for each state. The controller 800 implements a feedback control loop, in which operational parameters, such as pre-catalyst temperature 766 and post-catalyst oxygen level 769, are measured and these measurements are compared to desirable values. Differences between measured values and desired values are used to control other operational parameters, such as blower speed, feedstock feed auger speed and biochar extraction auger speed. For example, once the pyrolyzer 100 is operating, the controller 800 adjusts operating parameters to maintain a pyrolysis temperature of 1,000° C. in the carbonizer pot 500. Because embodiments of the present invention are intended for use in continuous production of biochar, power and heat, characteristics of the feedstock may vary considerably over time. This is in contrast with the prior art, in which biochar is produced in batches, in which the feedstock of any given back is relatively consistent.

In general, the subsystems, i.e., biochar production, energy production, heat production and pollution control, of the carbonizer 100 may pose somewhat competing requirements. In order to produce high quality biochar, the feedstock should not be completely pyrolyzed. The pyrolysis should not be too hot, nor should the feedstock pyrolyze too long, in order to produce biochar that is still about 20-30% of the initial mass of the feedstock. However, the pyrolysis should be hot enough to kill pathogens that may be present in the feedstock, such as when the feedstock includes human or animal solid waste. A pyrolysis temperature below about 800-1,000° C. is not hot enough to produce high quality biochar. For this reason, if the pyrolysis temperature is below about 800-1,000° C., the biochar extraction augers are not operated or operate slowly.

Typically, a carbonizer that produces high quality biochar also produces a relatively large amount of particulate matter, CO and other pollutants. In order for the catalyst 720 to combust pollutants in the smoke, the heat reaching the catalyst 720 should not be high enough to damage the catalyst 720 or its supporting substrate. The gasses that reach the catalyst 720 should be about 300° C. cooler than gasses produced by pyrolysis in the carbonizer, as the secondary combustion caused by the catalyst 720 generates additional heat.

The engine 760 requires sufficiently high temperatures to operate. Burning the feedstock in a sufficiently "smoky" fire generates heat and provides the catalyst 720 with enough unburned matter to generate heat through secondary combustion. This heat, in addition to the heat generated by pyrolysis, is enough to drive the engine 760. Thus, the pyrolysis should be managed in such a way as to generate sufficient unpyrolyzed matter in the hot gases emissions to fuel the catalyst 720. Heat not harvested by the engine 760 is captured by the heat exchanger 770.

If the carbonizer 100 may be fed with feedstock that has inconsistent characteristics, such as moisture content that varies over time, operating parameters of the carbonizer 100 should be periodically, occasionally or continuously adjusted by the controller 800 to meet the needs of all the subsystems. For example, a hotter pyrolysis is desirable when moisture content in the feedstock is relatively high. In general, increasing airflow into the carbonizer 100 increases pyrolysis temperature. On the other hand, if the temperature becomes too high, wetter feedstock may be added to cool down the pyrolysis process. In general, post-catalyst oxygen level values 769 are used to control blower speed, and post-catalyst temperature readings 767 are used to control the feedstock addition to the pyrolysis pot.

Prior art attempts to continuously produce biochar and power have failed because the operating parameters were not controlled, opposed to the embodiments in the present invention.

Startup

Startup occurs when the pyrolysis pot 500 temperature is below about 200° C. During startup, the combustion blower 135 to provide air to the pyrolysis pot 500 providing for the starter feedstock. The air may be supplied at a relatively low rate during the startup state. Wood pellets or natural charcoal may be used as a starter feedstock, as they combust readily and cleanly, which is helpful because the catalyst 720 is too cool to operate, at least in the early phase of startup. Thermal energy from the starter feedstock may heat the catalyst 720 to its operating temperature. The use of a heater, as described in U.S. Pat. No. 8,812,162, can be used to pre-heat the catalyst 720 and reduce startup emissions. The starter feedstock is lit via an igniter (507), such as liquid propane. During the startup state the feedstock auger 305, char/feedstock agitator 505 and the biochar extraction augers 400-405 remain off. When the pyrolysis temperature 7-50 reaches about 150° C., the controller 800 changes to a boost state.

Boost State

Boost state occurs when the stack temperature 755 is greater than about 150° C. and less than 600° C. The combustion blower 135 continues providing oxygen to the feedstock to maintain about 2% excess oxygen (as measured by the oxygen sensor 768 or 769). As the temperature rises, the feedstock auger 305 begins to add feedstock from the feedstock hopper 120 to the pyrolysis pot 500. The feedstock feed auger 305 may be operated relatively slowly at first, progressively increasing in speed during at least part of the boost state. As some feedstock is high in moisture, i.e. over about 35%, if the oxygen sensor 768 or 789 detect low levels of oxygen, the controller 800 causes more air to be provided to the pyrolysis, i.e., by increasing the speed of the combustion blower 135 to provide more air to the pyrolysis pot. If the oxygen level falls below about 2% and the pyrolysis pot temperature drops more than about 50° C. in a minute, the feedstock auger 305 and char/feedstock agitator 505 slows down or stops until the pyrolysis pot temperature and/or oxygen levels have time to recover. After a set period of time, such as about two minutes, normal feedstock and oxygen operations resume until the pyrolysis pot temperature exceeds about 300° C. and the post-catalyst or stack temperature probe exceeds about 250° C. for about one minute. During boost state, the char/feedstock agitator 505 and the biochar auger 305 run intermittently to increase the pyrolysis pot temperature.

Run State

Run state occurs when the pyrolysis pot temperature exceeds about 500° C. and the post-catalyst or stack temperature probe 775 measurement exceeds about 400° C. for over a minute. Feedstock feed speed is steadily increased until the pyrolysis pot temperature reaches about 650° C., such as +/− about 50° C. Feedstock feed speed is slowed if the post-catalyst temperature 767 exceeds about 700° C. or if the post-catalyst oxygen levels 769 are less than about 3%, such as +/− about 1%, the feedstock auger speed is reduced.

The controller 800 increases the primary air supply speed if the pyrolysis temperature falls below about 500° C., such as +/− about 50° C., or if the post-catalyst temperature exceeds about 700° C. and the post-catalyst oxygen level 769 is below about 3%, such as +/− about 1%.

The secondary air supply is increased if the post-catalyst oxygen level falls below about 3%, such as +/− about 1%, and decreases when the post-catalyst oxygen level 769 rises above about 6%, such as +/− about 1%.

During the run state the char/feedstock agitator 505 and the biochar augers 400-405 run continuously, delivering char to the biochar box 140. The biochar temperature probe 730 enables the controller 800 to manage the produced biochar 704 according to predetermined values, such as about 600° C. The controller 800 increases the speed of the char/feedstock agitator 505 and/or the biochar augers 400-405 to decrease the temperature of the produced biochar 704, or decreases the speed to increase the temperature of the produced biochar.

While the biochar is being made and delivered to the biochar box 140, the engine 760 uses thermal energy from the pyrolyzing feedstock and the catalyst to power the engine 760. To operate, a Sterling engine for example, may need a cylinder temperature of about 750° C. The heat from the feedstock combustion and catalyst reaction provide thermal energy needed to run the engine 760. Poor management of the feedstock gasses can result in thermal aging of the catalyst 720 and engine 760. The metal substrate catalyst 720 can generate high temperatures, i.e., above about 1,200° C., that can melt the aluminum oxide wash coat or primer that is used to attach precious metals to the substrate of the catalyst 720. Damage could also occur to the engine 760 if the cylinders of the engine reach too high a temperature. On the other hand, in contrast, low temperatures cause a build-up of carbon on the engine and prevent optimal operation.

Management of the feedstock gasses, thermal energy, oxygen levels, and biochar output temperature are important to the quality of the biochar produced, the amount of power and heat generated by the appliance/furnace and safety and longevity of the catalyst 720 and engine 760.

Idle State

Idle state occurs when the post-catalyst temperature exceeds a predetermined temperature, i.e., about 800° C. When this occurs, the feedstock auger 305 operation is reduced and the char/feedstock agitator 505 operation is suspended. The combustion fan 135 runs to maintain about 600° C. in the pyrolysis pot 500. The catalyst 720 or secondary oxygen level operates to maintain about 6% post-catalyst oxygen level 769. This increased airflow is used to cool the catalyst 720 and the engine 760. It also provides a higher fuel-to-air ratio to reduce the amount of fuel provided to the emissions reacting with the catalyst 720 by the combustion gasses.

Standby State

Standby state occurs when the stack temperature 775 falls below a predetermined temperature, such as about 100° C., for more than about two minutes and when the carbonizer 100 thermal energy output decreases, either as a result of running out of feedstock or due to a feedstock auger motor 130 failure. During this state, the feedstock auger motor 130 is stopped. If a high load is detected on the feedstock auger motor 130, and the drive is capable of operating in reverse, the controller 800 may run the feedstock motor 130 in reverse for a short duration, such as about ten seconds, and then try to run it forward again. After trying unsuccessfully to increase the post-catalyst exhaust stack temperature, the blower may continue to run at a very slow speed until the exhaust stack temperature falls below a predetermined value, after which the controller 800 suspends all motor operations. Optionally, the controller 800 may display a visual, auditable or electronic alarm notification to the user. The controller 800 may send one or more alerts, such as text messages, to an operator. Prior to the alarm the user may receive several alerts in anticipation of a standby state event.

Varying the speed of operation of the agitator 505 may vary the amount of syngas and/or volatile organic compounds (VOCs) produced in the combustion chamber 115. In general, more agitation increases syngas production, and less agitation reduces it. As the post-catalyst temperature rises above the carbonizer temperature, syngas and VOCs are being consumed. If the post catalyst temperature exceeds a temperature, such as about 700° C., the agitation may be reduced. If the post-catalyst temperature falls below a temperature, such as about 400° C., the agitation may be increased.

The controller 800 controls rates at which feedstock and air are supplied to the combustion chamber 115 and a rate of agitation by the agitator 505, so the amount of heat available to the engine 760 is relatively steady over time. A speed sensor, electric power sensor, steam pressure sensor or some other suitable sensor 761 may be coupled to the engine 760 to provide the controller 800 with information about how much energy the engine 760 is generating. If output of the engine 760 decreases to below a desired level, the controller 800 may increases the rate at which feedstock and/or air is supplied and/or the speed of agitation. Conversely, if the output of the engine 760 increases to above a desired level, the controller 800 may decrease the rate at which feedstock and/or air is supplied and/or the speed of agitation.

The controller 800 may automatically control the feedstock auger drive speed, based on biochar output temperature. As the biochar is delivered to the biochar extraction box 140, the temperature is monitored by a temperature sensor 730. If the temperature exceeds a predetermined temperature, such as about 400° C., the feedstock input auger speed is increased and the primary air speed is reduced. If the temperature of the biochar being delivered to the biochar extraction box 140 is less than a certain temperature, such as about 350° C., air blower 300 is increased to raise the pyrolysis temperature. If the temperature of the biochar is too high, the biochar yield, and amount of carbon in the biochar, is reduced. In addition, the ash content increases. If the biochar extraction box 140 temperature is too low and biochar is being removed from the combustion chamber 115 too quickly, the pyrolysis process may be compromised and may even stop. If feedstock, such as human waste is used, maintaining at least a minimum temperature is important for the removal of pathogens.

Similarly, the controller 800 may automatically control the biochar extraction auger 400-405 speed, based on biochar output temperature. If the temperature is above a predetermined temperature, such as about 400° C., the biochar output auger speed is increased. If the temperature of the biochar being delivered to the biochar extraction box 140 is below a certain temperature, such as about 350° C., removal speed is reduced.

The controller 800 may automatic control of the produced biochar quality through automatic management of the pyrolysis pot 500 temperature. Biochar quality can be improved by managing the temperature and the dwell time in the pyrolysis pot 500, dwell time in the biochar output augers 400-405 and by increasing or decreasing the pyrolysis pot temperature to within a predetermined range. As the pyrolysis pot temperature drops below a value, such as about 600° C., the controller increases the amount of air supplied to the pyrolysis pot, and biochar removal auger speed is decreased. When the biochar being delivered to the biochar extraction box 140 temperature exceeds a predetermined value, such as about 900° C., the biochar extraction auger speed is increased, and the feed stock auger speed input is increased. Optionally, the blower 135 speed may also be reduced to decrease the pyrolysis temperature by a calculated or predetermined rate of change.

The controller 800 may automatic control the produced biochar quality through automatic management of oxygen level, such as by controlling the amount of air introduced by the blower 135. The rate of air introduction may be increased or decreased at a predetermined rate of change to maintain the level of pyrolysis temperature that will maximize quality, based on a predetermined algorithm of energy output of the feedstock, percentage of feedstock to be converted to biochar and amount of specific chemical composition of the char. By increasing the air supply when the oxygen level, downstream of the catalyst, is below a predetermined value, VOCs are consumed and are not available to contaminate the biochar, therefore improving biochar quality.

The controller 800 may automatically control the biochar quality through automatic management of the biochar extraction auger speed. If the biochar is removed too quickly, sterilization and pyrolysis of the feedstock and removal the VOCs may not occur. Reducing the speed of the biochar extraction augers 400-405 may improve quality by increasing dwell time in the carbonizer and/or exposing the biochar to high temperatures.

Moisture in the feedstock may be used to cool the combustion chamber 115, such as by increasing the speed of the feedstock auger 305, if the combustion chamber temperature exceeds a predetermined temperature, such as about 900° C. Cooling the combustion chamber 115 may be advantageous to prevent producing ash, instead of biochar, and to prevent clinker production.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations, or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A continuous biochar carbonizer, comprising:
   an enclosed combustion chamber, having an exhaust stack for an exhaust stream;
   a pyrolysis pot, disposed within the enclosed combustion chamber;
   a catalytic converter disposed within the exhaust stack;
   a heat-driven engine thermally coupled to the exhaust stack, downstream of the catalytic converter;
   a feedstock conveyor coupled to supply feedstock in the form of solid biofuel to the pyrolysis pot of the combustion chamber;
   a feedstock motor mechanically coupled to the feedstock conveyor for driving the feedstock conveyor;
   an igniter, arranged within the pyrolysis pot, configured to light feedstock in the pyrolysis pot;
   a blower configured to supply fresh air to the pyrolysis pot within the combustion chamber;
   a blower motor mechanically coupled to the blower;
   an enclosed biochar extraction box;
   at least one biochar conveyor coupled to receive solid biochar from the pyrolysis pot of the combustion chamber and to convey the solid biochar to the biochar extraction box;
   a biochar motor mechanically coupled to the biochar conveyor;
   a pyrolysis temperature sensor disposed within the biochar pyrolysis pot;
   at least one sensor selected from: a temperature sensor disposed within the biochar extraction box, a volatile gas sensor disposed within the biochar extraction box, an oxygen sensor disposed within the pyrolysis pot, a temperature sensor disposed within the exhaust stack upstream of the catalytic converter, a temperature sensor disposed within the exhaust stack downstream of the catalytic converter, an oxygen sensor disposed within the exhaust stack downstream of the catalytic converter and a moisture sensor disposed within the exhaust stack;
   a memory storing a set of predetermined values, each predetermined value being associated with a respective sensor of the at least one sensor and a respective trigger condition of a set of trigger conditions, each trigger condition also being associated with a respective at least one of: the feedstock motor, the blower motor and the biochar motor; and
   a control circuit coupled to the memory, to the at least one sensor, to the feedstock motor, to the blower motor and to the biochar motor; the control circuit being configured to control operation of the feedstock motor, the blower motor and the biochar motor such that the enclosed pyrolysis pot operates at a temperature in a range anywhere between about 500° C. to about 1,000°

C. in order to produce biochar, and such that the biochar is delivered to the enclosed biochar extraction box, and repeatedly:
    receive a signal from each sensor of the at least one sensor; and
    compare each signal to the predetermined value associated with the sensor from which the signal was received to determine whether the trigger condition associated with the predetermined value is satisfied and, if, as a result of the comparison, the trigger condition is satisfied, send a signal to the at least one motor associated with the trigger condition to alter speed of operation thereof, the set of predetermined values having been selected to produce biochar in the pyrolysis pot and control quality of the biochar produced in the pyrolysis pot and delivered by the biochar conveyor to the biochar extraction box;
    wherein if a temperature reported by the temperature sensor disposed within the biochar pyrolysis pot is less than a first predetermined temperature, the control circuit is configured to increase the speed of operation of the blower motor and decrease the speed of operation of the biochar conveyor motor.

2. A continuous biochar carbonizer according to claim 1, further comprising a motor-driven mechanical agitator disposed within the pyrolysis pot, configured for agitation of the feedstock, and coupled to a motor; wherein:
    at least one trigger condition of the set of trigger conditions is associated with the agitator; and
    if any trigger condition associated with the agitator is satisfied, the control circuit is further configured to send a signal to the motor of the agitator to alter speed of operation thereof.

3. A continuous biochar carbonizer according to claim 2, wherein the at least one sensor comprises at least a temperature sensor disposed within the biochar extraction box and a temperature sensor disposed within the exhaust stack downstream of the catalytic converter.

4. A continuous biochar carbonizer according to claim 2, wherein the at least one sensor comprises the temperature sensor disposed within the exhaust stack downstream of the catalytic converter; and if a temperature reported by the temperature sensor disposed within the exhaust stack downstream of the catalytic converter exceeds a second predetermined temperature, the control circuit is configured to reduce the speed of operation of the agitator motor, and if the temperature reported by the temperature sensor disposed within the exhaust stack downstream of the catalytic converter is less than a third predetermined temperature, the control circuit is configured to increase the speed of operation of the agitator motor.

5. A continuous biochar carbonizer according to claim 1, wherein the at least one sensor comprises the temperature sensor disposed within the biochar extraction box; and if a temperature reported by the temperature sensor disposed within the biochar extraction box exceeds a fourth predetermined temperature, the control circuit is configured to increase the speed of operation of the feedstock conveyor motor and decreases the speed of operation of the blower motor, and if the temperature reported by the temperature sensor disposed within the biochar extraction box is less than a fifth predetermined temperature, the control circuit is configured to increase the speed of operation of the blower motor.

6. A continuous biochar carbonizer according to claim 1, wherein the at least one sensor comprises the temperature sensor disposed within the biochar extraction box; and if a temperature reported by the temperature sensor disposed within the biochar extraction box exceeds a sixth predetermined temperature, the control circuit is configured to increase the speed of operation of the biochar conveyor motor, and if the temperature reported by the temperature sensor disposed within the biochar extraction box is less than a seventh predetermined temperature, the control circuit is configured to decrease the speed of operation of the biochar conveyor motor.

7. A continuous biochar carbonizer according to claim 1, wherein the at least one sensor comprises the temperature sensor disposed within the biochar extraction box; and if a temperature reported by the temperature sensor disposed within the biochar extraction box exceeds an eighth predetermined temperature, the control circuit is configured to increase the speed of operation of the biochar conveyor motor and increase the speed of operation of the feedstock conveyor motor.

8. A continuous biochar carbonizer according to claim 7, wherein-if the temperature reported by the temperature sensor disposed within the biochar extraction box exceeds the eighth predetermined temperature, the control circuit is configured to decrease the speed of operation of the blower motor.

9. A continuous biochar carbonizer according to claim 1, wherein the at least one sensor comprises the temperature sensor disposed within the biochar extraction box; and if a temperature reported by the temperature sensor disposed within the biochar extraction box is less than a ninth predetermined temperature, the control circuit is configured to increase the speed of operation of the blower motor and decrease the speed of operation of the biochar conveyor motor, and if the temperature reported by the temperature sensor disposed within the biochar extraction box exceeds a tenth predetermined temperature, the control circuit is configured to increase the speed of operation of the biochar conveyor motor and increase the speed of operation of the feedstock conveyor motor.

10. A continuous biochar carbonizer according to claim 9, wherein the at least one sensor comprises the temperature sensor disposed within the biochar extraction box; and if the temperature reported by the temperature sensor disposed within the biochar extraction box exceeds the tenth predetermined temperature, the control circuit is configured to increase the speed of operation of the blower motor.

11. A continuous biochar carbonizer according to claim 1, wherein the at least one sensor comprises the oxygen sensor disposed within the exhaust stack downstream of the catalytic converter; and if an oxygen level reported by the oxygen sensor disposed within the exhaust stack downstream of the catalytic converter is less than an eleventh predetermined value, the control circuit is configured to increase the speed of operation of the blower motor, and if the oxygen level reported by the oxygen sensor disposed within the exhaust stack downstream of the catalytic converter exceeds a twelfth predetermined value, the control circuit is configured to decrease the speed of operation of the blower motor.

12. A continuous biochar carbonizer according to claim 1, wherein the control circuit is configured to control speed of operation of the biochar conveyor motor so as to maintain dwell time of the biochar in the pyrolysis pot between a thirteenth predetermined amount of time and fourteenth predetermined amount of time.

13. A continuous biochar carbonizer according to claim 1, wherein if a temperature reported by the temperature sensor disposed within the pyrolysis pot exceeds a fifteenth predetermined temperature, the control circuit is configured to increase the speed of operation of the feedstock conveyor motor, and if the temperature reported by the temperature sensor disposed within the pyrolysis pot is less than a sixteenth predetermined temperature, the control circuit is configured to decrease the speed of operation of the feedstock conveyor motor.

14. A continuous biochar carbonizer according to claim 1, wherein if a temperature reported by the temperature sensor disposed within the pyrolysis pot exceeds a nineteenth predetermined temperature, the control circuit is configured to increase the speed of operation of the biochar conveyor motor, and if the temperature reported by the temperature sensor disposed within the pyrolysis pot is less than a twentieth predetermined temperature, the control circuit is configured to decrease the speed of operation of the biochar conveyor motor.

15. A continuous biochar carbonizer according to claim 1, further comprising:
   a feedstock hopper, wherein the feedstock conveyor is coupled between the feedstock hopper and the pyrolysis pot;
   a feedstock supplement hopper; and
   a feedstock supplement conveyor coupled between the feedstock supplement hopper and the feedstock hopper, wherein the feedstock supplement conveyor and the feedstock conveyor operate at relative speeds so as to deliver feedstock and feedstock supplement at a predetermined ratio to the pyrolysis pot.

16. A continuous biochar carbonizer according to claim 1, further comprising a heat exchanger disposed within the exhaust stream downstream of the engine.

17. A continuous biochar carbonizer according to claim 1, further comprising a second motor-driven blower communicably coupled between at least one of the fresh air supply and the exhaust stack and the biochar extraction box to supply gas to the biochar extraction box.

18. A continuous biochar carbonizer according to claim 17, wherein:
   the at least one sensor comprises a volatile gas sensor disposed within the biochar extraction box;
   the memory stores a twenty-first predetermined value associated with the volatile gas sensor;
   the control circuit is coupled to the motor of the second blower to control speed of operation thereof;
   at least one trigger condition of the set of trigger conditions is associated with a motor of the second blower; and
   if a volatile gas level reported by the volatile gas sensor disposed within the biochar extraction box exceeds the twenty-first predetermined value, the control circuit is configured to send a signal to the motor of the second blower to increase speed of operation of the second blower.

19. A continuous biochar carbonizer according to claim 1, wherein the biochar extraction box defines a plurality of apertures communicably coupling the interior of the biochar extraction box to the fresh air supply.

20. A continuous biochar carbonizer according to claim 8, wherein the first predetermined temperature is about 600° C., and the eighth predetermined temperature is about 900° C.

21. A continuous biochar carbonizer according to claim 2, wherein the motor-driven mechanical agitator is coupled to the motor of the feedstock conveyor.

* * * * *